US010788462B2

(12) United States Patent
Troy et al.

(10) Patent No.: US 10,788,462 B2
(45) Date of Patent: Sep. 29, 2020

(54) DUAL FUNCTION NON-DESTRUCTIVE INSPECTION APPARATUS AND METHOD

(71) Applicant: The Boeing Company, Chicago, IL (US)

(72) Inventors: James J. Troy, Issaquah, WA (US); Daniel J. Wright, Mercer Island, WA (US); Scott W. Lea, Renton, WA (US); Gary Ernest Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 260 days.

(21) Appl. No.: 16/024,347

(22) Filed: Jun. 29, 2018

(65) Prior Publication Data
US 2020/0003734 A1    Jan. 2, 2020

(51) Int. Cl.
*G01N 25/72*   (2006.01)
*G01N 29/44*   (2006.01)
*G01N 29/04*   (2006.01)
*G01N 29/265*  (2006.01)

(52) U.S. Cl.
CPC .......... *G01N 29/265* (2013.01); *G01N 25/72* (2013.01); *G01N 29/04* (2013.01); *G01N 29/4454* (2013.01)

(58) Field of Classification Search
CPC ...... G01N 29/265; G01N 25/72; G01N 29/04; G01N 29/4454
USPC ......................................................... 73/601
See application file for complete search history.

(56) References Cited

U.S. PATENT DOCUMENTS

| | | | |
|---|---|---|---|
| 2008/0137105 A1* | 6/2008 | Howard | G01N 29/2418 356/630 |
| 2011/0148402 A1* | 6/2011 | Nenno | F22B 37/005 324/239 |
| 2015/0054942 A1* | 2/2015 | Coombs | G01N 29/04 348/125 |
| 2017/0052070 A1* | 2/2017 | Marsh | G01N 25/72 |
| 2017/0225804 A1* | 8/2017 | Hafenrichter | B64F 5/60 |

OTHER PUBLICATIONS

Troy et al., "Methods for Inspecting Structures Having Non-Planar Surfaces Using Location Alignment Feedback," U.S. Appl. No. 15/962,832, filed Apr. 25, 2018, 74 pages.
Georgeson et al., "Stabilization of Tool-Carrying End of Extended-Reach Arm of Automated Apparatus," U.S. Appl. No. 15/878,642, filed Jan. 24, 2018, 88 pages.
Troy et al., "Method for Controlling Location of End Effector of Robot Using Location Alignment Feedback,"U.S. Appl. No. 15/623,304, filed Jun. 14, 2017, 63 pages.

\* cited by examiner

*Primary Examiner* — Jacques M Saint Surin
(74) *Attorney, Agent, or Firm* — Yee & Associates, P.C.

(57) ABSTRACT

A dual function non-destructive inspection apparatus comprises a frame structure, a thermographic inspection system, a displacement system, and an ultrasonic inspection system. The frame structure has a channel, a first end, and a second end. The channel extends through the frame structure from the first end to the second end. The thermographic inspection system is associated with the first end of the frame structure. The displacement system is connected to the second end of the frame structure. The ultrasonic inspection system is connected to the displacement system such that the displacement system moves the ultrasonic inspection system relative to the channel of the frame structure.

20 Claims, 16 Drawing Sheets

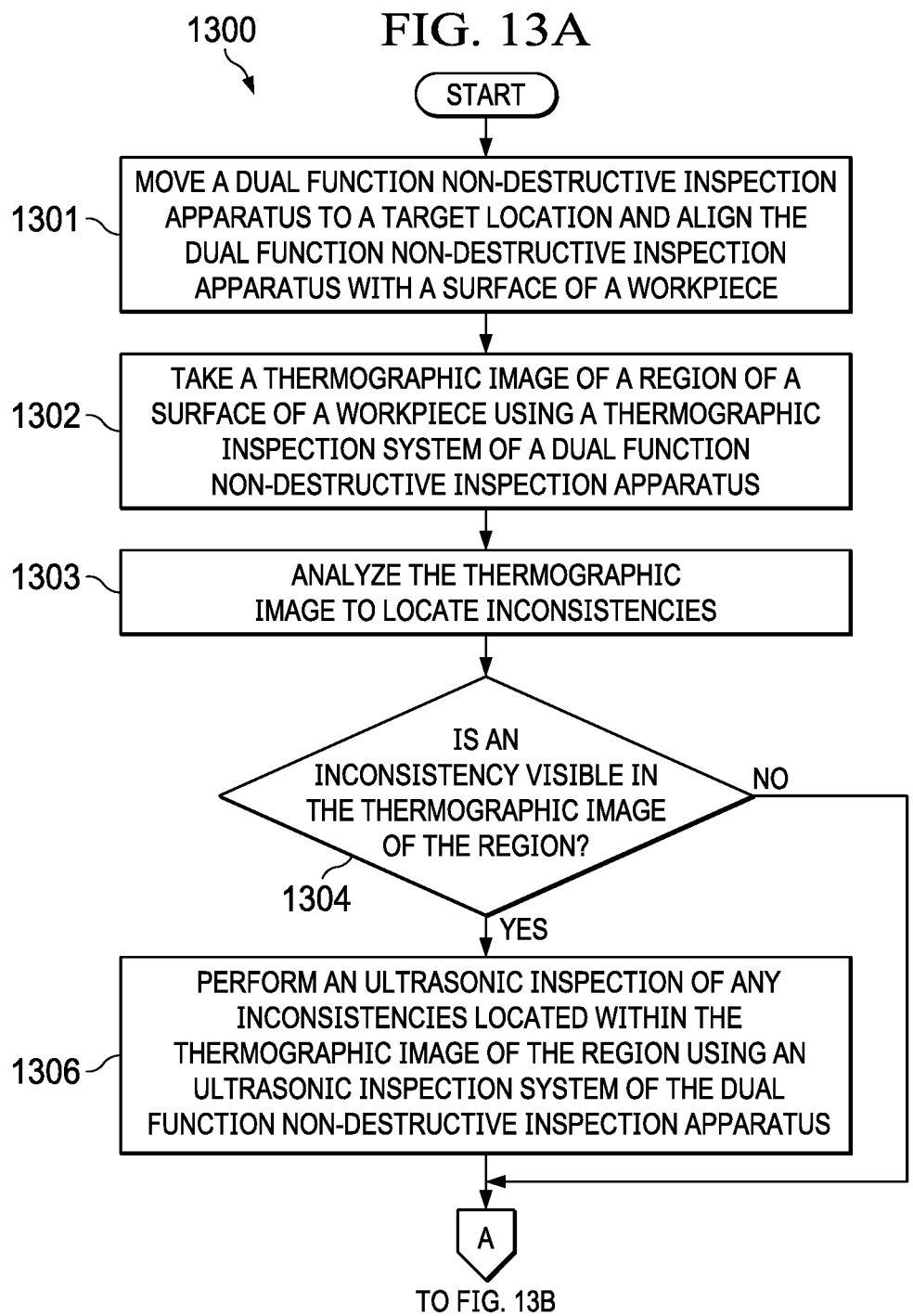

US 10,788,462 B2

DUAL FUNCTION NON-DESTRUCTIVE INSPECTION APPARATUS AND METHOD

GOVERNMENT CONTRACT

The invention described herein was made in the performance of work under NASA Contract No. ACC 2C21 and is subject to the provisions of Section 305 of the National Aeronautics and Space Act of 1958 (72 Stat. 435: 42 U.S.C. 2457.)

BACKGROUND INFORMATION

1. Field

The present disclosure relates generally to non-destructive inspection techniques. More specifically, the present disclosure relates to an apparatus and method for performing both ultrasonic and thermographic inspections.

2. Background

Workpieces, such as metal or composite structures, may be inspected to determine whether inconsistencies are present. The inspection may be performed using any desirable type of non-destructive inspection system. Each type of non-destructive inspection system has advantages and disadvantages. For example, ultrasound inspection systems take an undesirable amount of time to inspect a large structure. As another example, infrared inspection systems have undesirably low resolution for characterization of inconsistencies.

Therefore, it would be desirable to have a method and apparatus that takes into account at least some of the issues discussed above, as well as other possible issues. For example, it would be desirable to have a method and an apparatus that reduces the time to perform a non-destructive inspection of a large structure It would be desirable to have a method and an apparatus that reduces the time to locate and characterize inconsistencies in a large structure.

SUMMARY

An illustrative embodiment of the present disclosure provides a dual function non-destructive inspection apparatus. The dual function non-destructive inspection apparatus comprises a frame structure, a thermographic inspection system, a displacement system, and an ultrasonic inspection system. The frame structure has a channel, a first end, and a second end. The channel extends through the frame structure from the first end to the second end. The thermographic inspection system is associated with the first end of the frame structure. The displacement system is connected to the second end of the frame structure. The ultrasonic inspection system is connected to the displacement system such that the displacement system moves the ultrasonic inspection system relative to the channel of the frame structure.

Another illustrative embodiment of the present disclosure provides a method of inspecting a workpiece. A thermographic image is taken of a first region of a surface of a workpiece using a thermographic inspection system of a dual function non-destructive inspection apparatus. An inconsistency is located in the first region using the thermographic image. An ultrasonic inspection of the inconsistency is performed using an ultrasonic inspection system of the dual function non-destructive inspection apparatus after locating the inconsistency.

Yet another illustrative embodiment of the present disclosure provides an end effector configured to perform thermographic inspection and ultrasonic inspection. The end effector comprises a thermographic inspection system separated from an ultrasonic inspection system by a frame structure, and the ultrasonic inspection system movable relative to a line-of-sight of an infrared camera of the thermographic inspection system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 13A and 13B are an illustration of a flowchart of a method of inspecting a workpiece in accordance with an illustrative example;

DETAILED DESCRIPTION

Figure 1:
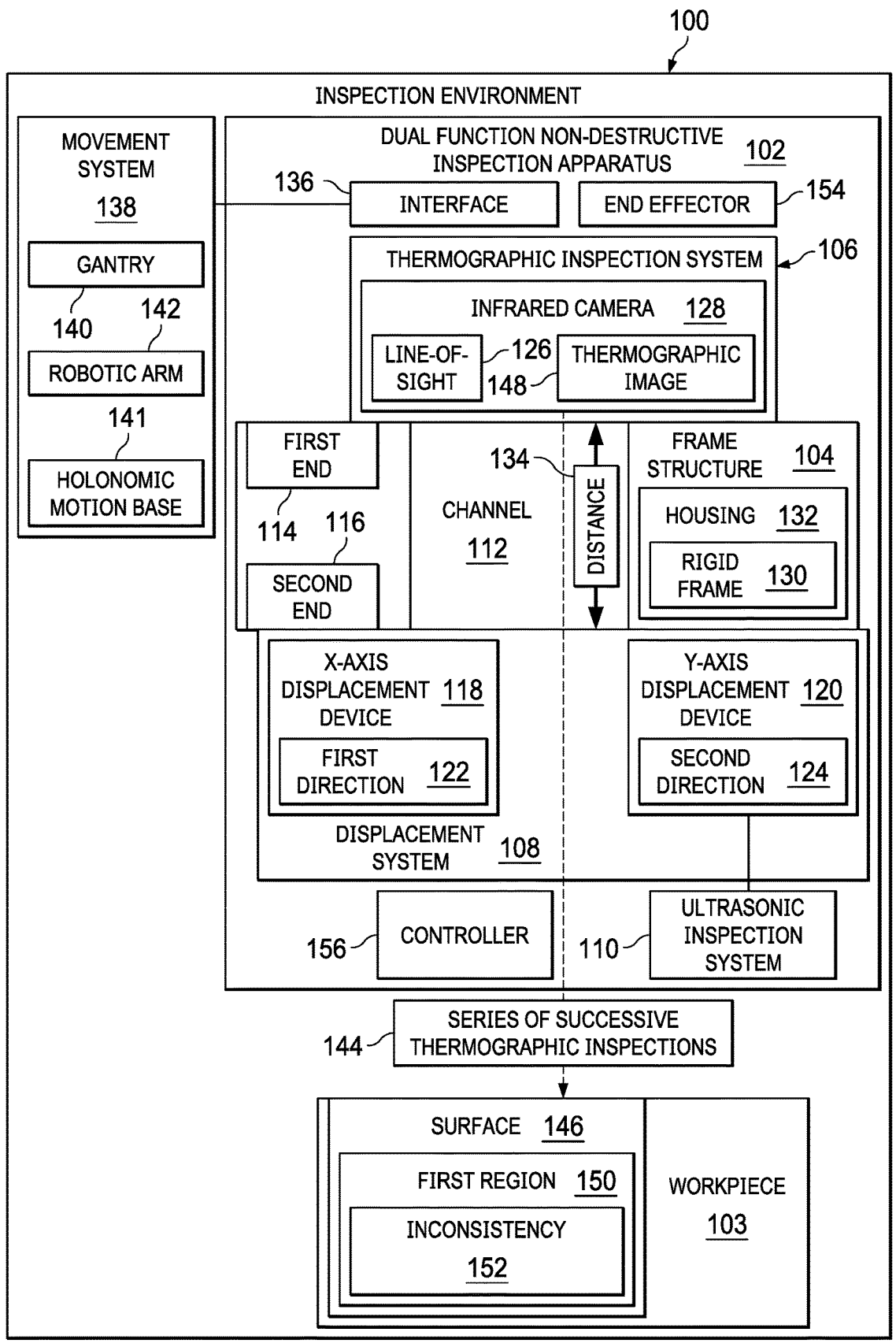
FIG. 1 is an illustration of a block diagram of an inspection environment in which a workpiece is inspected in accordance with an illustrative example.

The illustrative embodiments recognize and take into account one or more different considerations. For example, the illustrative embodiments recognize and take into account that aircraft are being designed and manufactured with greater and greater percentages of composite materials. The illustrative embodiments recognize and take into account that composite materials are used in aircraft to decrease the weight of the aircraft. This decreased weight improves performance features such as payload capacities and fuel efficiencies. Further, composite materials provide longer service life for various components in an aircraft.

The illustrative embodiments recognize and take into account that composite materials are tough, light-weight materials created by combining two or more functional components. For example, the illustrative embodiments recognize and take into account that a composite material may include reinforcing fibers bound in polymer resin matrix. The fibers may be unidirectional or may take the form of a woven cloth or fabric. The fibers and resins are arranged and cured or consolidated to form a composite material.

The illustrative embodiments recognize and take into account that in manufacturing composite structures, layers of composite material are typically laid up on a tool. The layers may be comprised of fibers in sheets. These sheets may take the form of fabrics, tape, tows, or other suitable forms. In some cases, resin may be infused or preimpregnated into the sheets. These types of sheets are commonly referred to as prepreg.

The illustrative embodiments recognize and take into account that the different layers of prepreg may be laid up in different orientations and different numbers of layers may be used depending on the thickness of the composite structure being manufactured. These layers may be laid up by hand or using automated lamination equipment such as a tape laminating machine or a fiber placement system.

The illustrative embodiments recognize and take into account that if an inconsistency is present, the composite structure may be reworked. The illustrative embodiments recognize and take into account that examples of inconsistencies that may be present in a composite structure include voids, porosity, delamination, foreign object debris (FOD), in-plane and out of plane wrinkles, and other types of inconsistencies. The illustrative embodiments recognize and take into account that characterizing an inconsistency relative to its features such as size, geometry or depth or classifying a type of inconsistency is used in making a rework determination.

The illustrative embodiments recognize and take into account that it is desirable to inspect large composite structures quickly and with desirable characterizations of inconsistencies. The illustrative embodiments recognize and take into account that infrared inspection techniques are fast and can cover large areas extremely quickly. The illustrative embodiments recognize and take into account that the characterization capability of infrared inspection techniques for some types of inconsistencies is not as effective as ultrasound inspection.

The illustrative embodiments recognize and take into account that ultrasound inspection can provide more in-depth characterization of composites and metals than infrared inspection. The illustrative embodiments recognize and take into account that ultrasonic inspection is tied to strength allowables in composites for structural assessment and performance prediction. The illustrative embodiments recognize and take into account that the speed of ultrasonic inspections cannot match the full-field infrared inspection method when imaging large areas at a time.

The illustrative embodiments recognize and take into account that multiple types of non-destructive inspection techniques may be applied to a single workpiece. The illustrative embodiments recognize and take into account that moving multiple non-destructive inspection systems around a workpiece may take an undesirable amount of time. The illustrative embodiments recognize and take into account that it would be desirable to provide multiple types of non-destructive inspection techniques in a reduced amount of time.

The illustrative examples recognize and take into account that switching back and forth between different types of NDI modes may take an undesirable amount of time. The illustrative examples recognize and take into account that it would also be desirable to have a system in which changing between ultrasonic and thermographic inspection modes would be relatively quick and easy to perform.

The illustrative examples present a method and an apparatus for performing multiple types of non-destructive inspection using one apparatus. The illustrative examples present a dual function non-destructive inspection apparatus comprising a frame structure, a thermographic inspection system, a displacement system, and an ultrasonic inspection system. The illustrative examples present an apparatus and methods for reducing inspection time of large workpieces.

Turning now to FIG. 1, an illustration of a block diagram of an inspection environment in which a workpiece is inspected is depicted in accordance with an illustrative example. Inspection environment 100 includes dual function non-destruction inspection apparatus 102. Dual function non-destruction inspection apparatus 102 performs non-destructive inspections on workpiece 103.

Workpiece 103 has any desirable size, shape, and material. In some illustrative examples, workpiece 103 is a composite structure. In some illustrative examples, workpiece 103 is a metal structure. In some illustrative examples, workpiece 103 is a component of an aircraft.

Dual function non-destructive inspection apparatus 102 has frame structure 104, thermographic inspection system 106, displacement system 108, and ultrasonic inspection system 110. Frame structure 104 has channel 112, first end 114, and second end 116. Channel 112 extends through frame structure 104 from first end 114 to second end 116.

Thermographic inspection system 106 is associated with first end 114 of frame structure 104. Displacement system 108 is connected to second end 116 of frame structure 104. Ultrasonic inspection system 110 is connected to displacement system 108 such that displacement system 108 moves ultrasonic inspection system 110 relative to channel 112 of frame structure 104.

Displacement system 108 comprises x-axis displacement device 118 and y-axis displacement device 120 coupled to x-axis displacement device 118 such that y-axis displacement device 120 is configured for y-axis movement in first direction 122 and x-axis displacement device 118 is configured for movement of y-axis displacement device 120 in second direction 124 perpendicular to first direction 122. The x-axis and y-axis as described are perpendicular to each other.

First direction 122 is perpendicular to channel 112. Second direction 124 is perpendicular to channel 112. First direction 122 and second direction 124 are within a plane.

For example, when channel 112 is considered to extend in a Z-direction, first direction 122 is an X-direction and second direction 124 is a Y-direction. Each of first direction 122 and second direction 124 are relative to set components of dual function non-destructive inspection apparatus 102, such as frame structure 104.

Dual function non-destructive inspection apparatus 102 is moved within inspection environment 100. For example, dual function non-destructive inspection apparatus 102 may be moved within inspection environment 100 using movement system 138. When dual function non-destructive inspection apparatus 102 is moved within inspection environment 100, first direction 122 and second direction 124 change relative to a set coordinate system for inspection environment 100.

Displacement system 108 is mounted such that x-axis displacement device 118 does not obstruct channel 112 of frame structure 104. Y-axis displacement device 120 is moveable such that y-axis displacement device 120 does not obstruct channel 112 of frame structure 104 during operation of thermographic inspection system 106.

Line-of-sight 126 of infrared camera 128 of thermographic inspection system 106 is directed towards second end 116 and extends through channel 112 of frame structure 104. During thermographic inspections using dual function non-destructive inspection apparatus 102, displacement system 108 and ultrasonic inspection system 110 are positioned such that neither displacement system 108 nor ultrasonic inspection system 110 obstruct channel 112. During thermographic inspections using dual function non-destructive inspection apparatus 102, displacement system 108 and ultrasonic inspection system 110 are positioned such that neither displacement system 108 nor ultrasonic inspection system 110 obstruct line-of-sight 126 of infrared camera 128.

Frame structure 104 is configured to act as a baffle for infrared camera 128. Infrared camera 128 desirably reads IR energy directly from surface 146 of workpiece 103. Frame structure 104 also serves to reflect light from flash lamps of thermographic inspection system 106 onto surface 146. Frame structure 104 also keeps light from spilling outside of housing 132 during the flash phase. As depicted, frame structure 104 comprises rigid frame 130 and housing 132. Rigid frame 130 has sufficient strength to support displacement system 108 and ultrasonic inspection system 110. Distance 134 of channel 112 is set by rigid frame 130. Distance 134 of channel 112 separates ultrasonic inspection system 110 from thermographic inspection system 106.

Housing 132 surrounds and forms channel 112. Frame structure 104 keeps light from spilling outside of housing 132 during the flash phase.

An ultrasonic transducer of ultrasonic inspection system 110 is directed away from frame structure 104. The ultrasonic transducer of ultrasonic inspection system 110 and infrared camera 128 of thermographic inspection system 106 are directed such that ultrasonic inspection system 110 and thermographic inspection system 106 may inspect a same surface of workpiece 103 without moving dual function non-destructive inspection apparatus 102.

As depicted, dual function non-destructive inspection apparatus 102 has interface 136 configured to connect dual function non-destructive inspection apparatus 102 to movement system 138 for movement within inspection environment 100. Interface 136 takes the form of any desirable type of connector.

Movement system 138 takes the form of any desirable quantity or type of movement devices or structures. In some illustrative examples, movement system 138 comprises gantry 140. In some illustrative examples, movement system 138 comprises robotic arm 142. In some other illustrative examples, movement system 138 comprises holonomic motion base 141.

Movement system 138 moves and positions dual function non-destructive inspection apparatus 102 relative to workpiece 103. Dual function non-destructive inspection apparatus 102 is moved relative to workpiece 103 to perform series of successive thermographic inspections 144 of surface 146 of workpiece 103.

In some illustrative examples, series of successive thermographic inspections 144 are performed in sequence prior to performing an ultrasonic inspection using ultrasonic inspection system 110. In some illustrative examples, ultrasonic inspections are performed in between thermographic inspections of series of successive thermographic inspections 144. Each of series of successive thermographic inspections 144 is of a different region of surface 146 of workpiece 103.

Inconsistencies within thermographic images produced during each of series of successive thermographic inspections 144 are located. In some illustrative examples, inconsistencies within each thermographic image from a respective thermographic inspection are located substantially in real-time. In these illustrative examples, when inconsistencies are located substantially in real-time, inconsistencies within each thermographic image are located significantly immediately after taking the respective thermographic image. Taking the respective thermographic image is a timed exposure process. In some illustrative examples, taking a thermographic image takes 10 seconds or more.

In some other illustrative examples, inconsistencies within each thermographic image are located after each of series of successive thermographic inspections 144 is performed.

In one illustrative example, thermographic image 148 of first region 150 of surface 146 of workpiece 103 is taken using thermographic inspection system 106 of dual function non-destructive inspection apparatus 102, while the ultrasonic inspection system 110 is positioned generally outside of the cross-sectional opening area of the channel 112 such that the ultrasonic inspection system 110 is not between the thermographic inspection system 106 and the workpiece 103. Taking thermographic image 148 of first region 150 is performed as one of series of successive thermographic inspections 144 of surface 146 of workpiece 103.

Inconsistency 152 in first region 150 is located using thermographic image 148, where thermographic image areas having pixilation with high contrast in intensity may be indicative of inconsistencies such as voids, porosity, delamination or wrinkles. In some illustrative examples, inconsistency 152 is located substantially in real-time. When inconsistencies are located substantially in real-time, inconsistencies within each thermographic image are located significantly immediately after taking the respective thermographic image. In some illustrative examples, inconsistency 152 is located after series of successive thermographic inspections 144 is completed.

An ultrasonic inspection is performed of inconsistency 152 using ultrasonic inspection system 110 of dual function non-destructive inspection apparatus 102 after locating inconsistency 152 in the thermographic image and correlating to a location on the workpiece 103. In some illustrative examples, ultrasonic inspection system 110 performs the ultrasonic inspection in response to locating inconsistency 152, by controlling the x-axis displacement device 118 and y-axis displacement device 120 to move the ultrasonic inspection system 110 in the opening area of the channel 112 to a position corresponding to the location of the identified inconsistency 152. In some illustrative examples, thermographic image 148 is taken while ultrasonic inspection system 110 is in contact with surface 146 of workpiece 103. When ultrasonic inspection system 110 is in contact with surface 146 of workpiece 103, an ultrasonic inspection may be performed substantially immediately after taking thermographic image 148.

In other illustrative examples, thermographic image 148 is taken when ultrasonic inspection system 110 is a distance away from surface 146. In these illustrative examples, an ultrasonic inspection of inconsistency 152 may be performed after series of successive thermographic inspections 144 are all performed.

To perform an ultrasonic inspection of inconsistency 152, dual function non-destructive inspection apparatus 102 is positioned within inspection environment 100 relative to workpiece 103 such that ultrasonic inspection system 110 is in contact with surface 146. To perform an ultrasonic inspection of a portion of surface 146, ultrasonic inspection system 110 is moved relative to surface 146 using x-axis displacement device 118 and y-axis displacement device 120.

When ultrasonic inspection system 110 is performing an ultrasonic inspection of a portion of surface 146 of workpiece 103, ultrasonic inspection system 110 obstructs a portion of channel 112. In some illustrative examples, after locating inconsistency 152, all of first region 150 is inspected using ultrasonic inspection system 110. In some illustrative examples, after locating inconsistency 152, a portion of first region 150 including inconsistency 152 is inspected using ultrasonic inspection system 110.

In some illustrative examples, an ultrasonic inspection of inconsistency 152 is performed when a type or other characteristic of inconsistency 152 is not identifiable from thermographic image 148. In some illustrative examples, all inconsistencies located using thermographic inspection system 106 receive ultrasonic inspection using ultrasonic inspection system 110.

In some illustrative examples, dual function non-destructive inspection apparatus 102 is an end effector 154. End effector 154 is configured to perform thermographic inspection and ultrasonic inspection.

As depicted, end effector 154 comprises thermographic inspection system 106 separated from ultrasonic inspection system 110 by frame structure 104 and ultrasonic inspection system 110 movable relative to line-of-sight 126 of infrared camera 128 of thermographic inspection system 106.

When surface 146 is curved, the ultrasonic probe of ultrasonic inspection system 110 scanning over surface 146 will follow a curved surface. The ultrasonic probe of ultrasonic inspection system 110 will follow a curved surface because the ultrasonic probe is riding on surface 146.

In the illustrative examples, an IR image, such as thermographic image 148, of surface 146 enables positioning in an x-y plane of inspection environment 100. Contour following maps the UT data onto the shape of surface 146. This is typically unwrapped and displayed as a plane for UT analysis purposes. In some illustrative examples, contour following is implemented using software such as collision detection software.

Correspondence between the IR image and the UT image can be determined using encoding of the scan arm extension, head angle, and surface travel. The IR image can then be mapped directly onto the UT data, which can be displayed as a flat surface or in its 3-D shape. Also, if the 3-D model of surface 146 is available, and the location of the inspection is known, no encoding is needed, and mapping of both data set can be done onto the surface with appropriate transformations.

For general dual inspection purposes, the divergence of the UT scan travel from an x-y plane within inspection environment 100 will be minimal. For general dual inspection purposes, positional correspondence between IR image and UT image inconsistency indications will be good enough for locating an inconsistency first (with thermographic inspection), and characterizing it second (with ultrasonic inspection).

As depicted, dual function non-destructive inspection apparatus 102 includes controller 156. Controller 156 is configured to control at least one of thermographic inspection system 106, ultrasonic inspection system 110, displacement system 108, or movement system 138. For example, controller 156 may control performance of series of successive thermographic inspections 144 by thermographic inspection system 106. As another example, controller 156 may control movement of ultrasonic inspection system 110 by displacement system 108 as ultrasonic inspection system performs ultrasonic inspections of surface 146. In some illustrative examples, controller 156 of dual function non-destructive inspection apparatus 102 controls the ultrasonic inspection of an inconsistency based on location data determined from a thermographic image.

Controller 156 may be implemented in at least one of hardware or software. Controller 156 may be a processor unit in a computer system or a specialist circuit depending on the particular implementation. In some implementations of controller 156, the software to control the motion of dual function non-destructive inspection apparatus 102 and manage the sequencing of inspections may be through the use of a finite state machine.

The illustration of inspection environment 100 in FIG. 1 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, ultrasonic inspection system 110 has a force application system to provide passive compliant movement relative to surface 146 of workpiece 103. The force application system may be spring loaded, pneumatic, or any other desirable force application. This enables ultrasonic inspection system 110 to adapt to curved surfaces. Alternatively, another illustrative example may comprise curved tracks on end effector 154 to enable end effector 154 to move relative to a generally curved surface.

As another example, although controller 156 is depicted as part of dual function non-destructive inspection apparatus 102, in some illustrative examples, controller 156 may be located elsewhere. For example, controller 156 may be part of a computer system within inspection environment 100. In these illustrative examples, controller 156 communicates with dual function non-destructive inspection apparatus 102 in any desirable fashion. For example, controller 156 may communicate with dual function non-destructive inspection apparatus 102 using either a wired communication system or a wireless communication system. In another example, controller 156 may be a part of a computer system outside of inspection environment 100.

Figure 2:
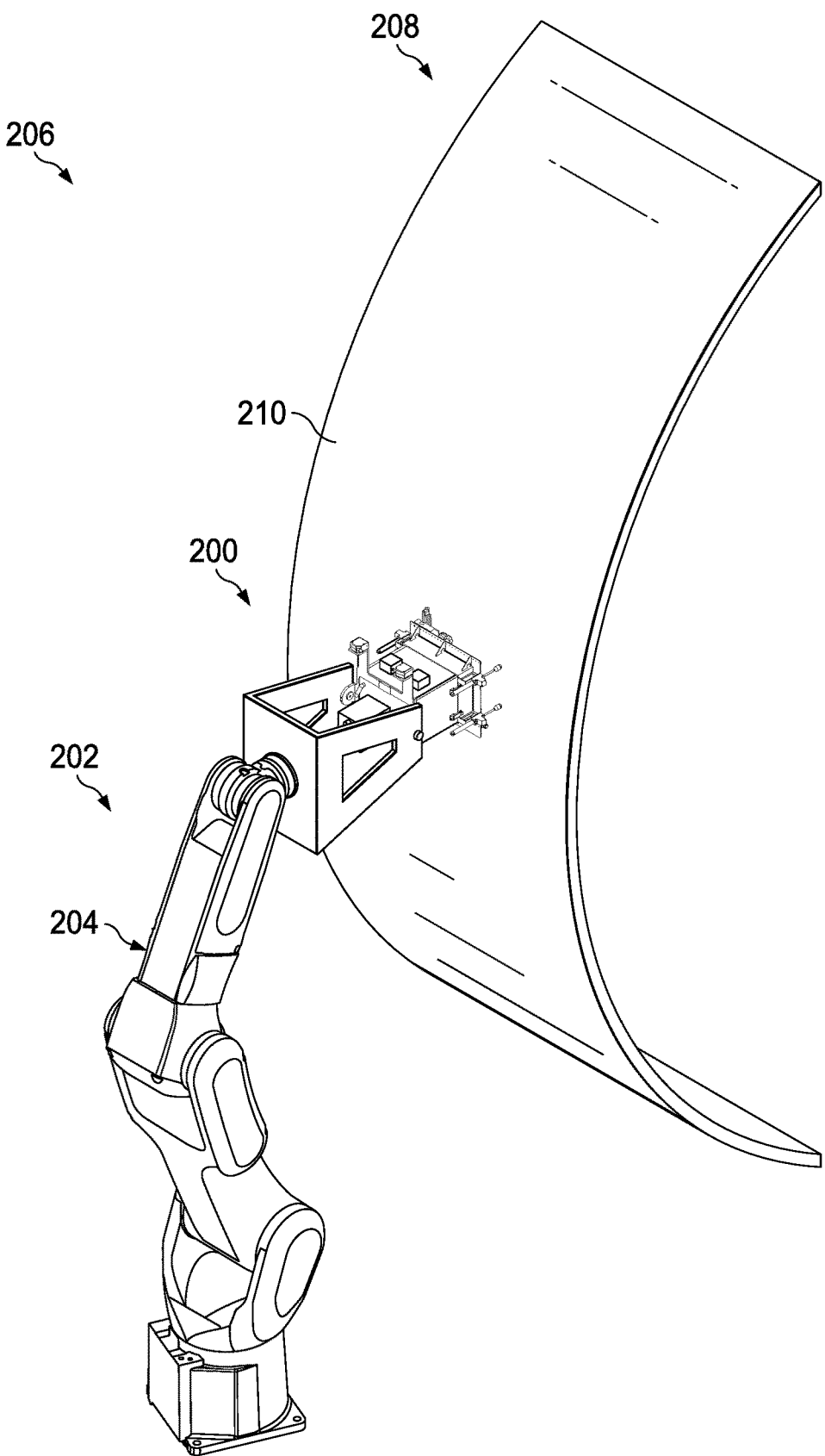
FIG. 2 is an illustration of a dual function non-destructive inspection apparatus within an inspection environment in accordance with an illustrative embodiment.

Turning now to FIG. 2, an illustration of a dual function non-destructive inspection apparatus within an inspection environment is depicted in accordance with an illustrative embodiment. Dual function non-destructive inspection apparatus 200 is a physical implementation of dual function non-destructive inspection apparatus 102. Dual function non-destructive inspection apparatus 200 is connected to movement system 202. Movement system 202 is a physical implementation of movement system 138 of FIG. 1. As depicted, movement system 202 is robotic arm 204.

Movement system 202 moves dual function non-destructive inspection apparatus 200 within inspection environment 206. Movement system 202 moves dual function non-destructive inspection apparatus 200 relative to workpiece 208 to perform non-destructive inspection of workpiece 208. Movement system 202 moves dual function non-destructive inspection apparatus 200 to take a series of successive thermographic inspections of surface 210 of workpiece 208.

Figure 3:
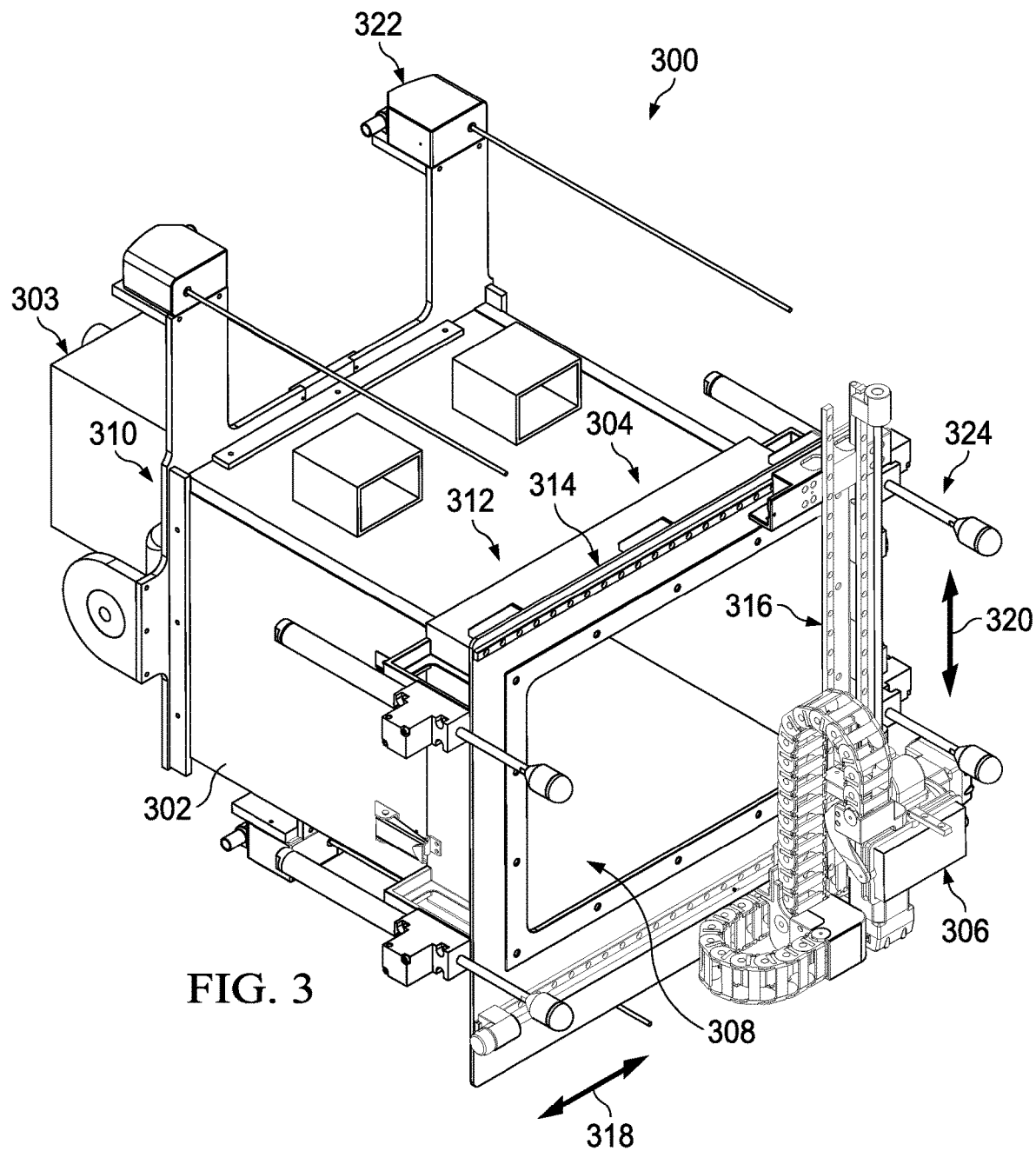
FIG. 3 is an illustration of a perspective view of a dual function non-destructive inspection apparatus in accordance with an illustrative embodiment.

Turning now to FIG. 3, an illustration of a perspective view of a dual function non-destructive inspection apparatus is depicted in accordance with an illustrative embodiment. Dual function non-destructive inspection apparatus 300 is a physical implementation of dual function non-destructive inspection apparatus 102 of FIG. 1. In some illustrative examples, dual function non-destructive inspection apparatus 300 is the same as dual function non-destructive inspection apparatus 200 of FIG. 2.

Dual function non-destructive inspection apparatus 300 has frame structure 302, a thermographic inspection system 303, displacement system 304, and ultrasonic inspection system 306. Frame structure 302 has channel 308, first end 310, and second end 312. Channel 308 extends through frame structure 302 from first end 310 to second end 312.

Thermographic inspection system 303 is associated with first end 310 of frame structure 302. Displacement system 304 is connected to second end 312 of frame structure 302. Ultrasonic inspection system 306 is connected to displacement system 304 such that displacement system 304 moves ultrasonic inspection system 306 relative to channel 308 of frame structure 302.

Displacement system 304 has x-axis displacement device 314 and y-axis displacement device 316. Displacement system 304 is mounted such that x-axis displacement device 314 does not obstruct channel 308 of frame structure 302. Y-axis displacement device 316 is moveable such that y-axis displacement device 316 does not obstruct channel 308 of frame structure 302 during operation of thermographic inspection system 303.

Displacement system 304 comprises x-axis displacement device 314 and y-axis displacement device 316 coupled to x-axis displacement device 314 such that y-axis displacement device 316 is configured for y-axis movement in first direction 318 and x-axis displacement device 314 is configured for movement of y-axis displacement device 316 in second direction 320 perpendicular to first direction 318. As depicted, x-axis displacement device 314 and ultrasonic inspection system 306 are not obstructing channel 308.

X-axis displacement device 314 includes a linear rail. Y-axis displacement device 316 includes a linear rail.

Dual function non-destructive inspection apparatus 300 includes other systems to track and control the position of dual function non-destructive inspection apparatus 300 within an inspection environment. For example, dual function non-destructive inspection apparatus 300 has laser trackers 322 configured to monitor a distance of dual function non-destructive inspection apparatus 300 from a workpiece. As another example, dual function non-destructive inspection apparatus 300 has extendable and retractable legs 324 for stabilizing and maintaining a distance away from a workpiece.

Figure 4:
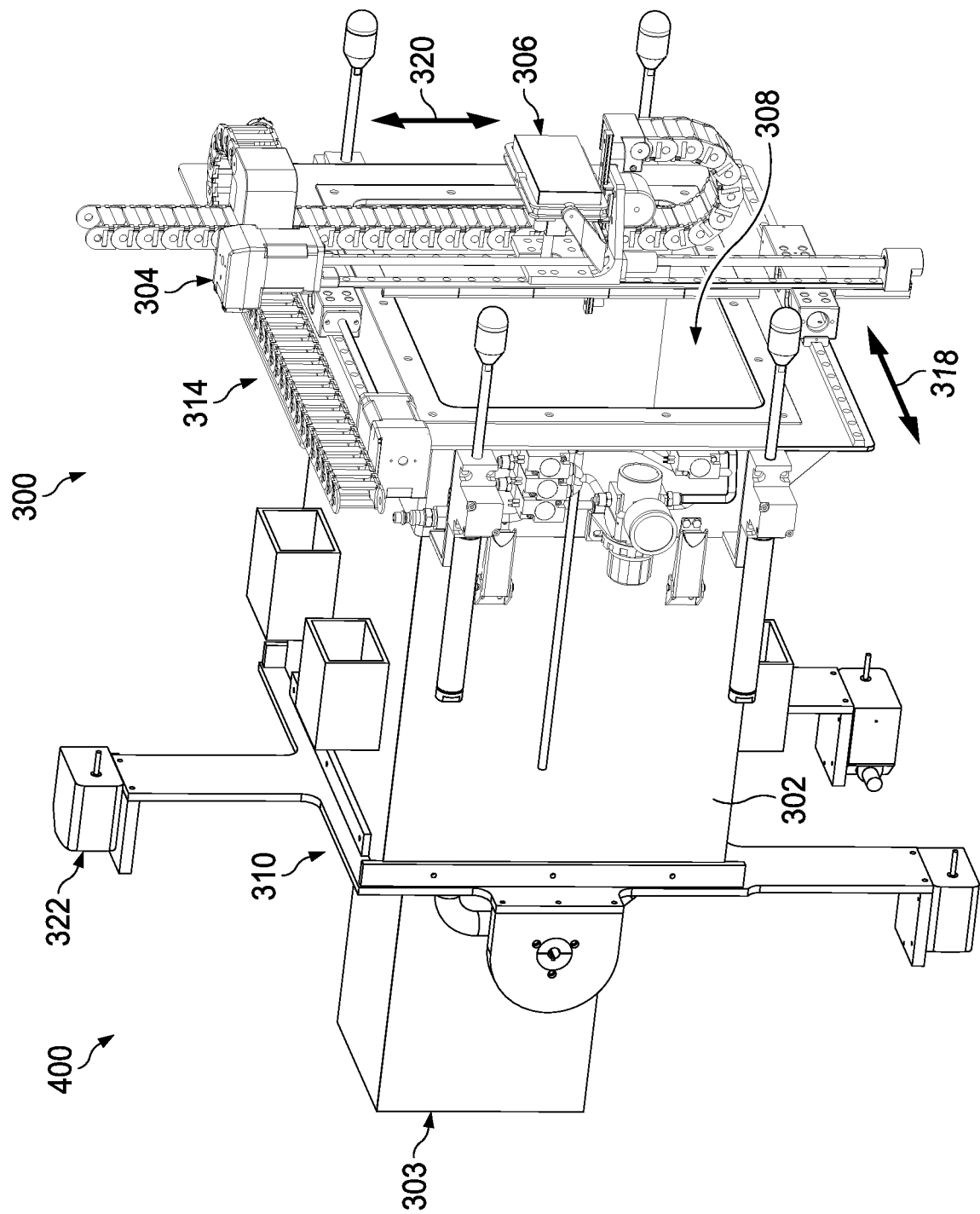
FIG. 4 is an illustration of a perspective view of a dual function non-destructive inspection apparatus in accordance with an illustrative embodiment.

Turning now to FIG. 4, an illustration of a perspective view of a dual function non-destructive inspection apparatus is depicted in accordance with an illustrative embodiment. View 400 is a view of dual function non-destructive inspection apparatus 300 where ultrasonic inspection system 306 is positioned to perform an ultrasonic inspection. As depicted, ultrasonic inspection system 306 and y-axis displacement device 316 are obstructing a portion of channel 308.

Figure 5:
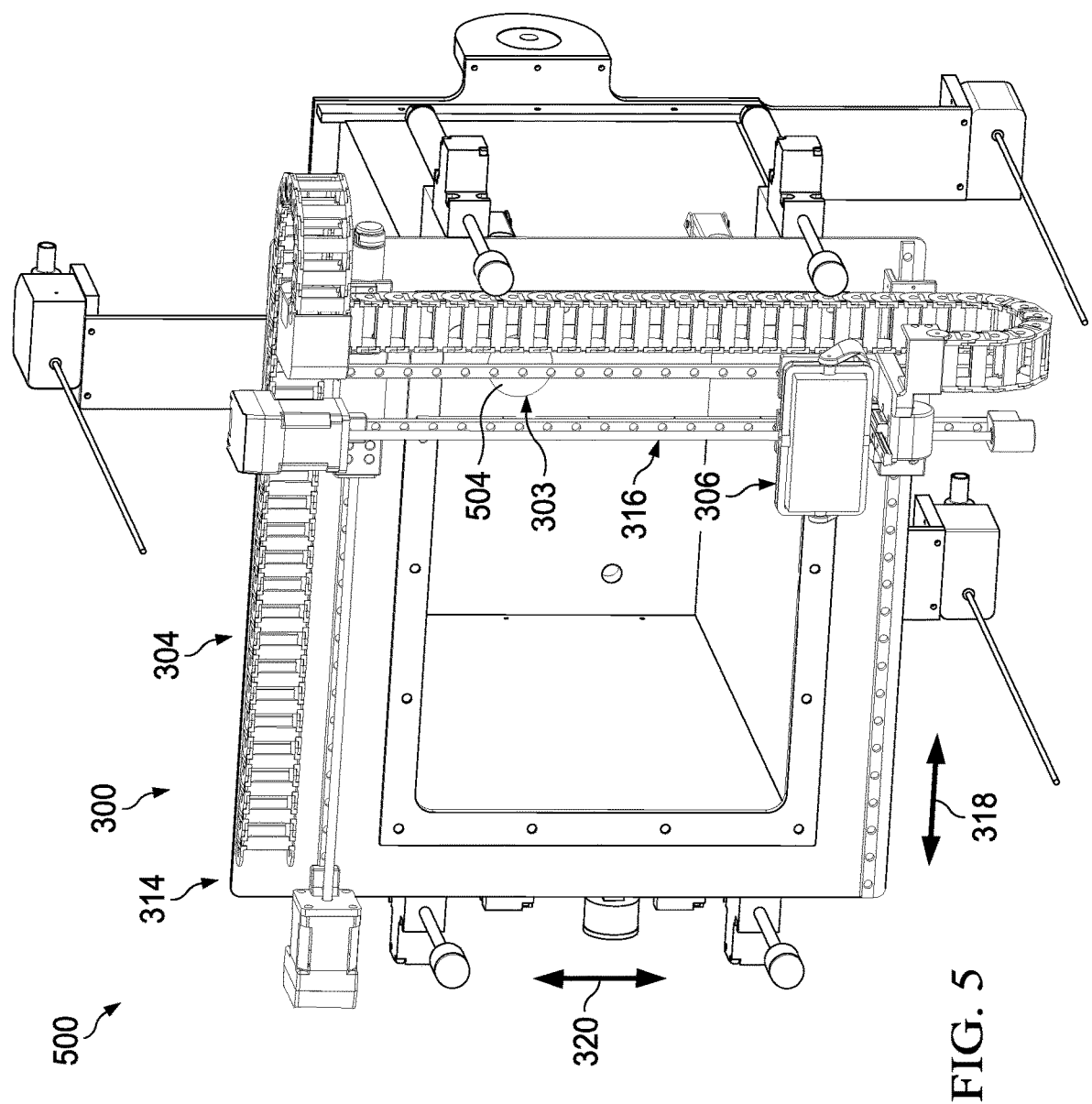
FIG. 5 is an illustration of a front perspective view of a dual function non-destructive inspection apparatus in accordance with an illustrative embodiment.

Turning now to FIG. 5, an illustration of a front perspective view of a dual function non-destructive inspection apparatus is depicted in accordance with an illustrative embodiment. View 500 is a front perspective view of dual function non-destructive inspection apparatus 300 of FIGS. 3 and 4. Thermographic inspection system 303 is visible in view 500. Infrared camera 504 of thermographic inspection system 303 is visible through channel 308.

In view 500, channel 308 is unobstructed. In view 500 a line-of-sight of infrared camera 504 is unobstructed. In view 500, dual function non-destructive inspection apparatus 300 is prepared to perform thermographic inspections.

Figure 6:
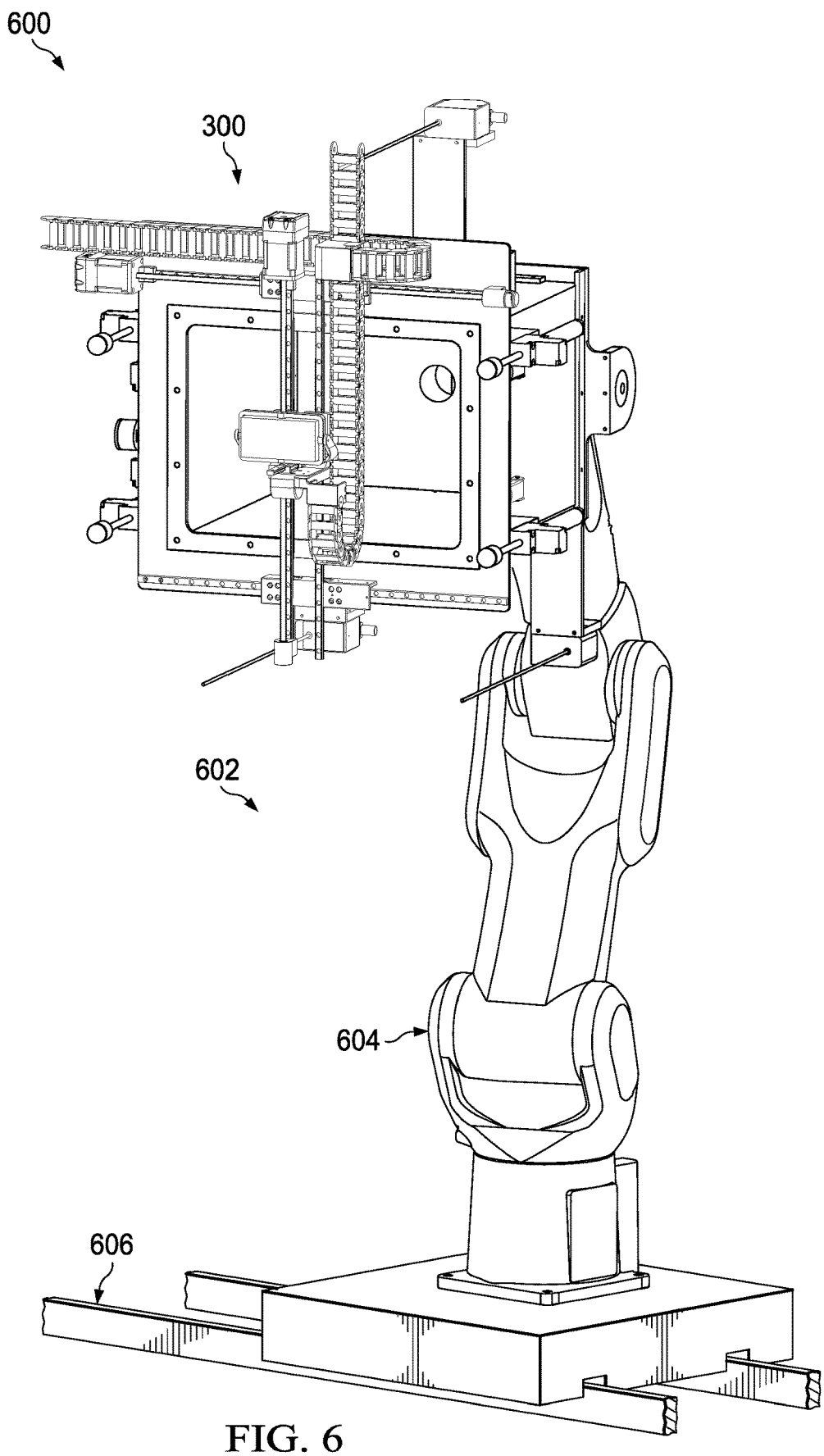
FIG. 6 is an illustration of a front perspective view of a dual function non-destructive inspection apparatus and movement system in accordance with an illustrative embodiment.

Turning now to FIG. 6, an illustration of a front perspective view of a dual function non-destructive inspection apparatus is depicted in accordance with an illustrative embodiment. View 600 is a view of dual function non-destructive inspection apparatus 300 of FIGS. 3-5. In view 600, channel 308 is obstructed. In view 600 a line-of-sight of infrared camera 504 is partially obstructed. In view 600, dual function non-destructive inspection apparatus 300 is prepared to perform ultrasonic inspections.

In view 600, dual function non-destructive inspection apparatus 300 is connected to movement system 602. Movement system 602 takes the form of robotic arm 604 on track 606.

Figure 7:
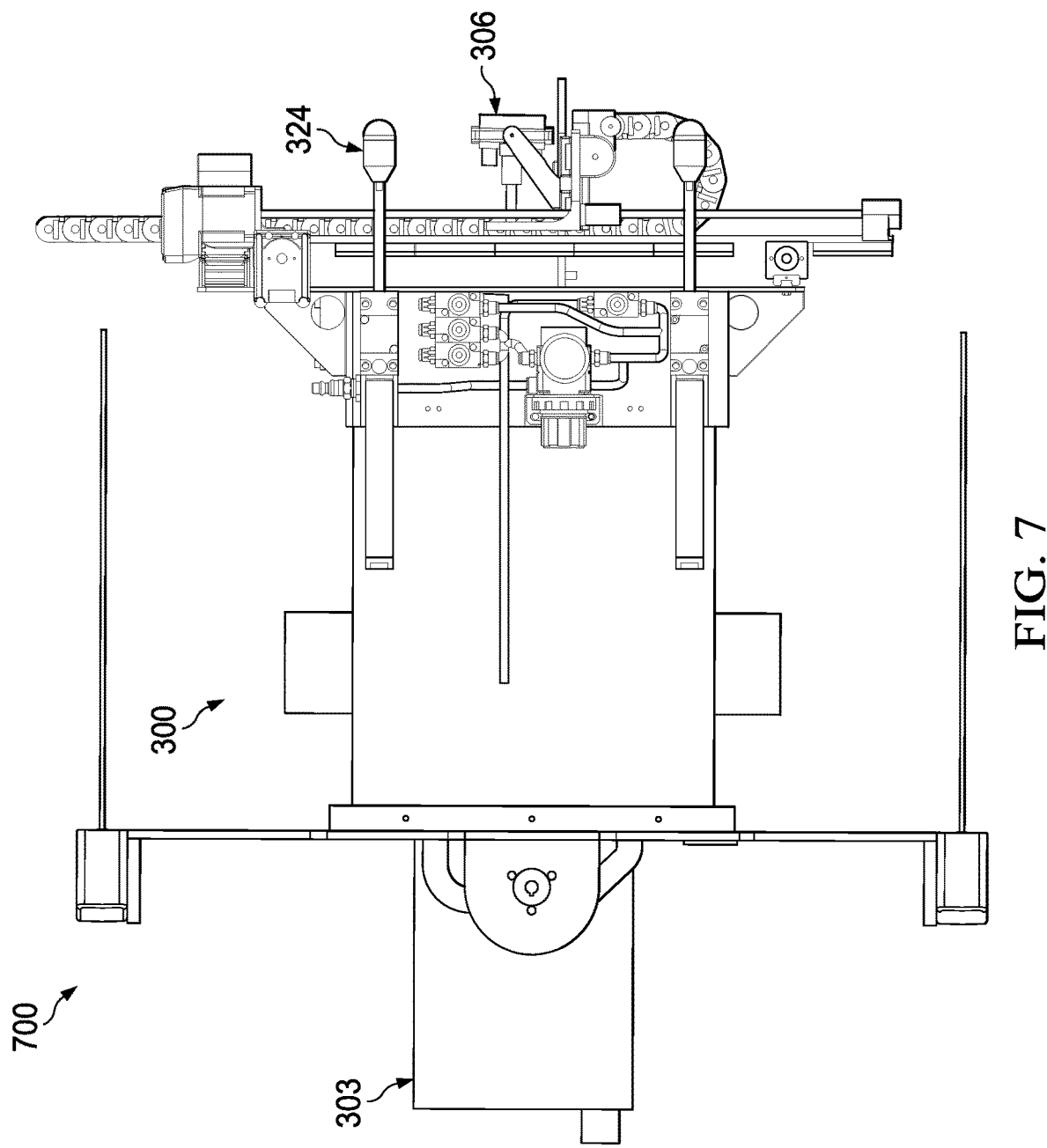
FIG. 7 is an illustration of a side view of a dual function non-destructive inspection apparatus in accordance with an illustrative embodiment.

Turning now to FIG. 7, an illustration of a side view of a dual function non-destructive inspection apparatus is depicted in accordance with an illustrative embodiment. View 700 is a side view of dual function non-destructive inspection apparatus 300 of FIGS. 3-6. In view 700, dual function non-destructive inspection apparatus 300 is prepared to perform ultrasonic inspections. Extendable and retractable legs 324 are set to maintain a distance away from a workpiece to perform an ultrasonic inspection. In some illustrative examples, a thermographic inspection may be performed while ultrasonic inspection system 306 is in contact with a surface of a workpiece.

Figure 8:
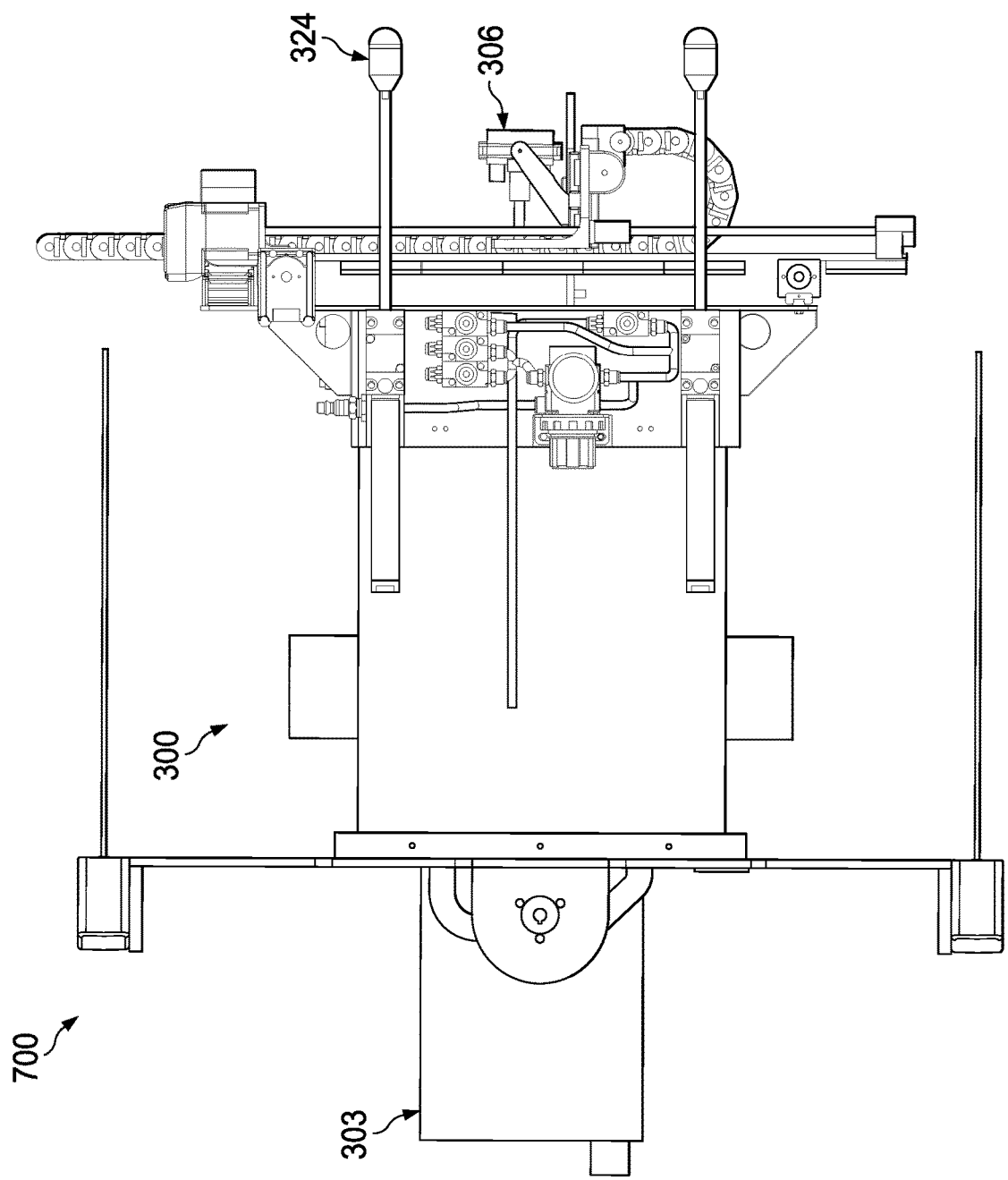
FIG. 8 is an illustration of a side view of a dual function non-destructive inspection apparatus in accordance with an illustrative embodiment.

Turning now to FIG. 8, an illustration of a side view of a dual function non-destructive inspection apparatus is depicted in accordance with an illustrative embodiment. View 800 is a side view of dual function non-destructive inspection apparatus 300 of FIGS. 3-7. In view 800, dual function non-destructive inspection apparatus 300 is prepared to perform thermographic inspections. Extendable and retractable legs 324 are set to maintain a distance away from a workpiece such that ultrasonic inspection system 306 does not contact a surface of a workpiece.

Figure 9:
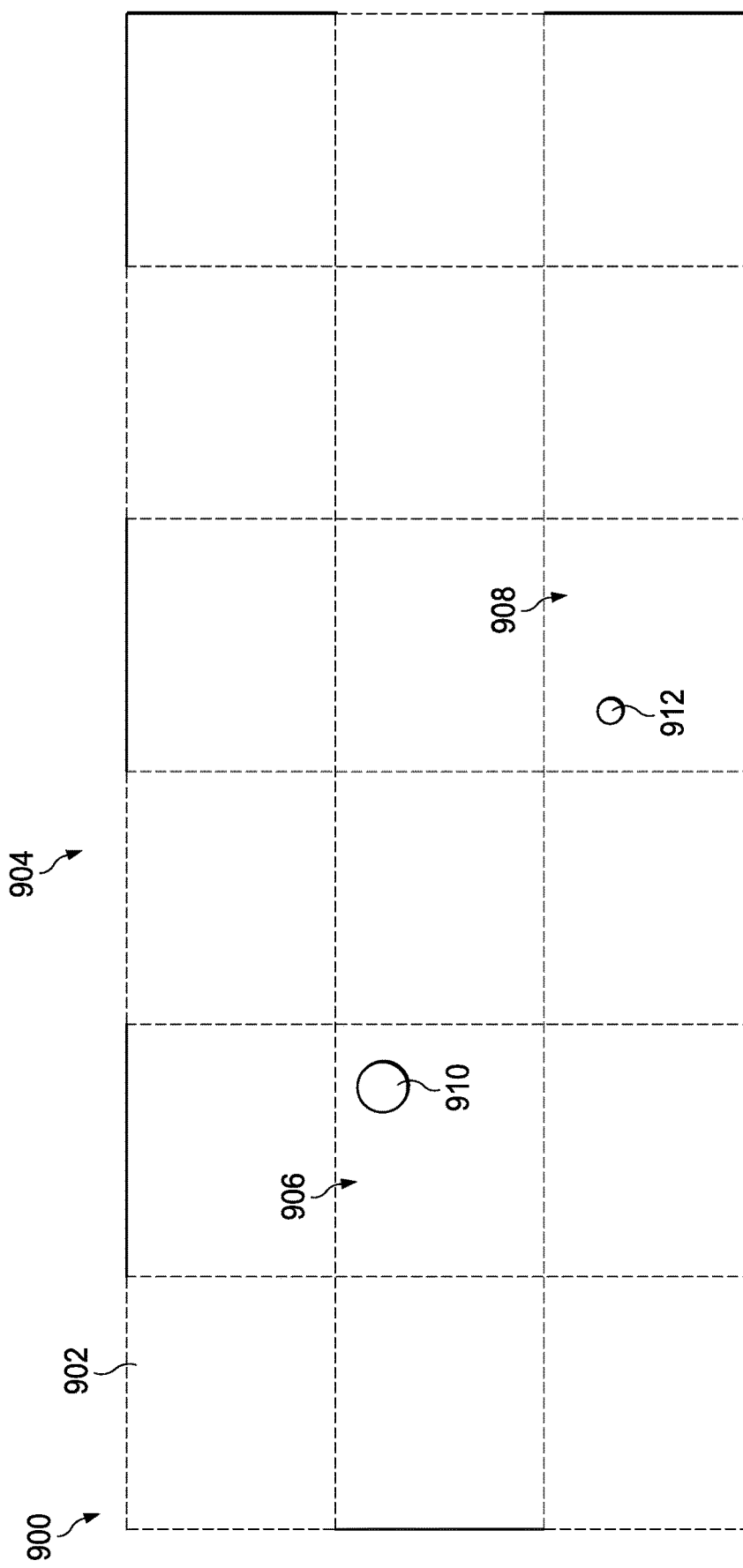
FIG. 9 is an illustration of a front view of a workpiece in accordance with an illustrative embodiment.

Turning now to FIG. 9, an illustration of a front view of a workpiece is depicted in accordance with an illustrative embodiment. Workpiece 900 has surface 902 which has been divided into plurality of regions 904. Each of plurality of regions 904 is inspected by a respective inspection of series of successive thermographic inspections 144 of FIG. 1. A dual function non-destructive inspection apparatus, such as dual function non-destructive inspection apparatus 102 of FIG. 1 or dual function non-destructive inspection apparatus 300 of FIG. 3 may perform a series of successive thermographic inspections on plurality of regions 904.

Plurality of regions 904 includes region 906 and region 908. Region 906 may be a physical implementation of first region 150 of FIG. 1. Inconsistency 910 is present within region 906. In some illustrative examples, after locating inconsistency 910, an ultrasonic inspection of inconsistency 910 is performed. In some illustrative examples, a portion of region 906 containing inconsistency 910 receives ultrasonic inspection. In other illustrative examples, all of region 906 receives ultrasonic inspection after locating inconsistency 910.

In some illustrative examples, ultrasonic inspection of inconsistency 910 is performed prior to completing thermographic inspection of all of plurality of regions 904. In these illustrative examples, inconsistency 910 may be located from a thermographic image of region 906 substantially in real-time. In these illustrative examples, when inconsistencies are located substantially in real-time, any inconsistencies within the thermographic image are located significantly immediately after taking the respective thermographic image. Taking the respective thermographic image is a timed exposure process. In some illustrative examples, taking a thermographic image takes 10 seconds or more.

In some illustrative examples, ultrasonic inspection of inconsistency 910 is performed after completing thermographic inspection of all of plurality of regions 904. In these illustrative examples, ultrasonic inspection of any inconsistencies, including inconsistency 910, will be performed during one ultrasonic inspection step following the thermographic inspection step.

Region 908 may be a physical implementation of first region 150 of FIG. 1. Inconsistency 912 is present within region 908. In some illustrative examples, after locating inconsistency 912, an ultrasonic inspection of inconsistency 912 is performed. In some illustrative examples, a portion of region 908 containing inconsistency 912 receives ultrasonic inspection. In other illustrative examples, all of region 908 receives ultrasonic inspection after locating inconsistency 912.

In some illustrative examples, ultrasonic inspection of inconsistency 912 is performed prior to completing thermographic inspection of all of plurality of regions 904. In these illustrative examples, inconsistency 912 may be located from a thermographic image of region 908 substantially in real-time.

In some illustrative examples, ultrasonic inspection of inconsistency 912 is performed after completing thermographic inspection of all of plurality of regions 904. In these illustrative examples, ultrasonic inspection of any inconsistencies, including inconsistency 912, will be performed during one ultrasonic inspection step following the thermographic inspection step.

Although plurality of regions 904 is shown as bordering each other, in some illustrative examples, plurality of regions 904 may be overlapping. When plurality of regions 904 overlap, all of surface 902 is inspected.

Figure 10:
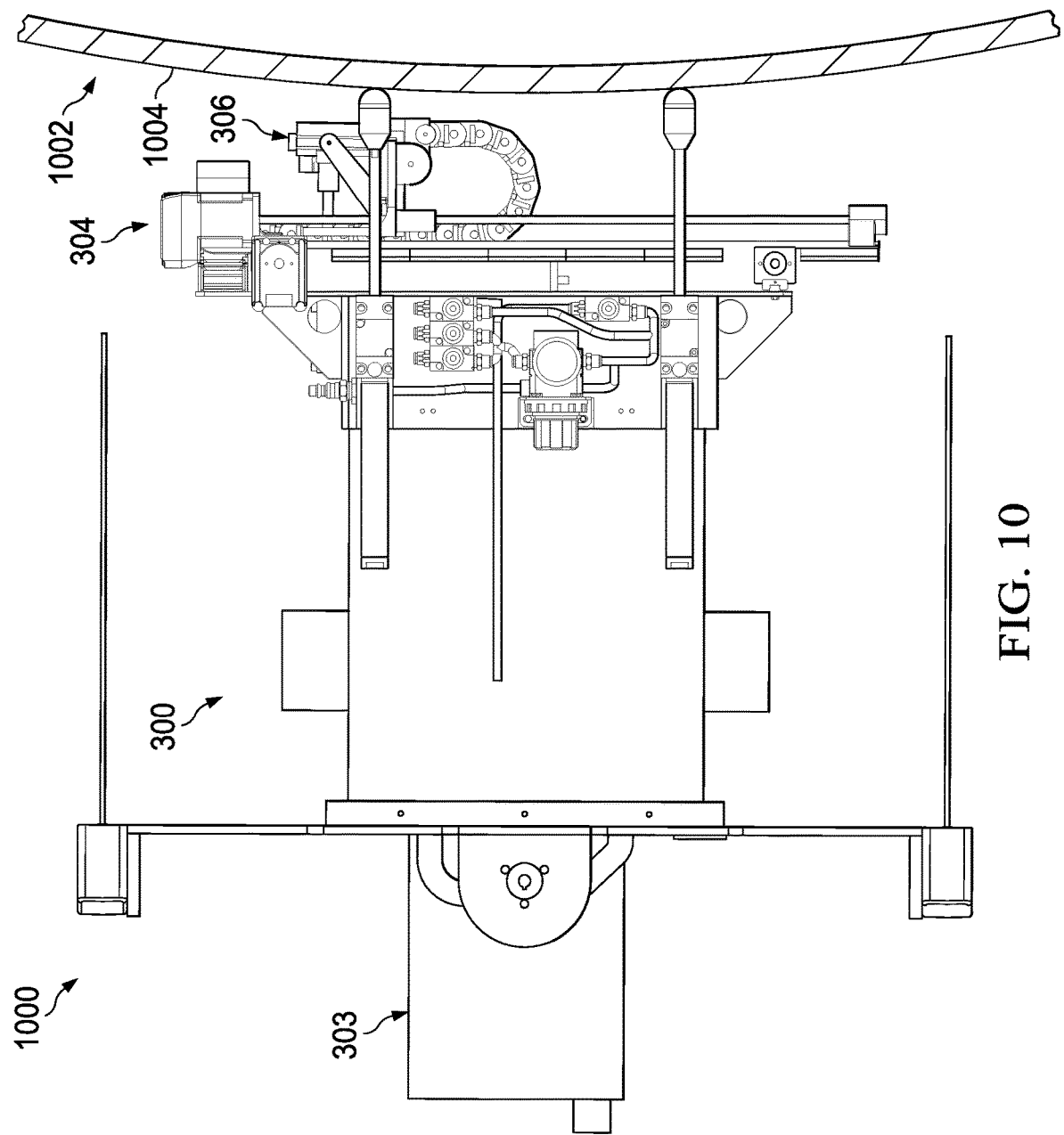
FIG. 10 is an illustration of a side view of a dual function non-destructive inspection apparatus performing an ultrasonic inspection on a workpiece in accordance with an illustrative embodiment.

Turning now to FIG. 10, an illustration of a side view of a dual function non-destructive inspection apparatus performing an ultrasonic inspection on a workpiece is depicted in accordance with an illustrative embodiment. View 1000 is a view of dual function non-destructive inspection apparatus 300 performing an ultrasonic inspection on workpiece 1002. In view 1000, ultrasonic inspection system 306 of dual function non-destructive inspection apparatus 300 is contacting surface 1004 of workpiece 1002. To perform an ultrasonic inspection, ultrasonic inspection system 306 moves along surface 1004 using displacement system 304.

Figure 11:
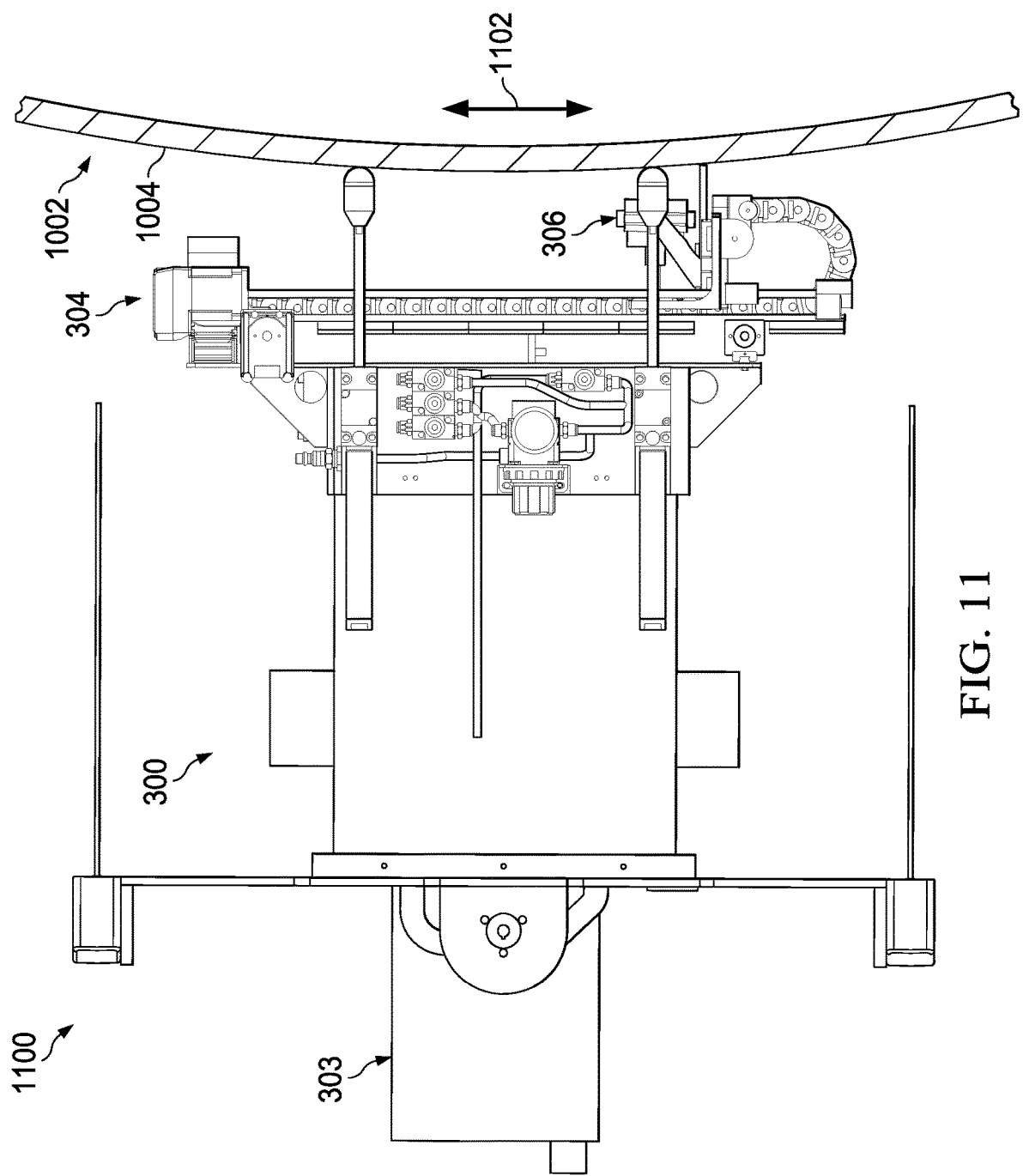
FIG. 11 is an illustration of a side view of a dual function non-destructive inspection apparatus performing an ultrasonic inspection on a workpiece in accordance with an illustrative embodiment.

Turning now to FIG. 11, an illustration of a side view of a dual function non-destructive inspection apparatus performing an ultrasonic inspection on a workpiece is depicted in accordance with an illustrative embodiment. View 1100 is a view of dual function non-destructive inspection apparatus 300 performing an ultrasonic inspection on workpiece 1002. In view 1100, ultrasonic inspection system 306 of dual function non-destructive inspection apparatus 300 is contacting surface 1004 of workpiece 1002.

In view 1100, ultrasonic inspection system 306 has moved from the position seen in view 1000. In view 1100, y-axis displacement device 316 has moved ultrasonic inspection system 306 in second direction 1102.

Figure 12:
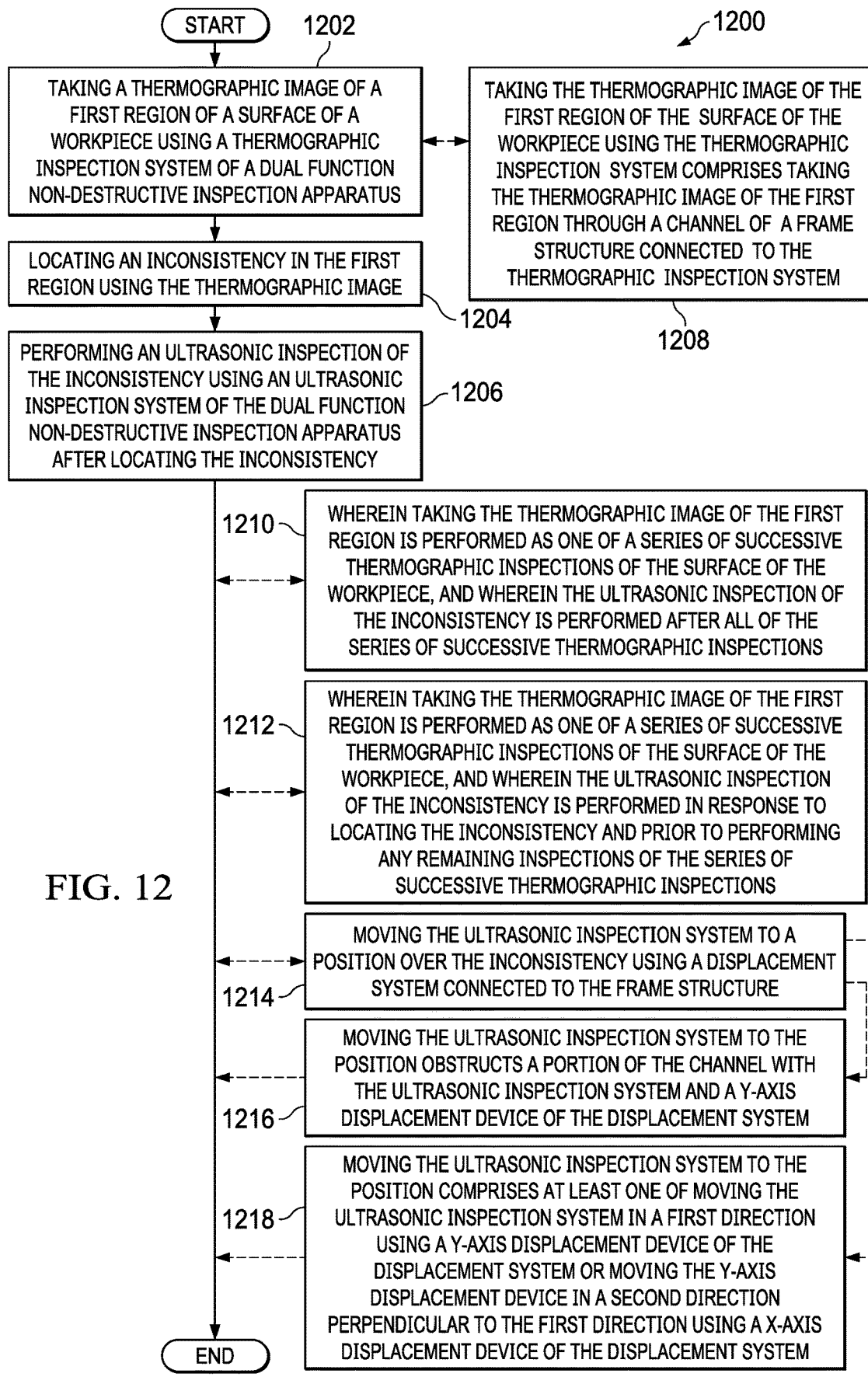
FIG. 12 is an illustration of a flowchart of a method for inspecting a workpiece in accordance with an illustrative example.

Turning now to FIG. 12, an illustration of a flowchart of a method for inspecting a workpiece is depicted in accordance with an illustrative example. Method 1200 may be implemented using dual function non-destructive inspection apparatus 102 of FIG. 1. Method 1200 may be used to inspect workpiece 103 of FIG. 1. Method 1200 may be implemented using dual function non-destructive inspection apparatus 200 of FIG. 2. Method 1200 may be used to inspect workpiece 208 of FIG. 2. Method 1200 may be implemented using dual function non-destructive inspection apparatus 300 of FIGS. 3-8 and 10-11. Method 1200 may be used to inspect workpiece 900 of FIG. 9.

Method 1200 takes a thermographic image of a first region of a surface of a workpiece using a thermographic inspection system of a dual function non-destructive inspection apparatus (operation 1202). Method 1200 locates an inconsistency in the first region using the thermographic image (operation 1204). Method 1200 performs an ultrasonic inspection of the inconsistency using an ultrasonic inspection system of the dual function non-destructive inspection apparatus after locating the inconsistency (operation 1206). Afterwards, the method terminates.

A controller, such as controller 156 of FIG. 1, controls any desirable operations of method 1200. In some illustrative examples, a controller controls the performance of the thermographic inspection system. In some illustrative examples, the same controller controls the performance of the ultrasonic inspection. In some illustrative examples, a controller of the dual function non-destructive inspection apparatus controls the ultrasonic inspection of the inconsistency based on location data determined from the thermographic image. In some illustrative examples, the controller also controls at least one of a movement system or a displacement system.

In some illustrative examples, the thermographic image is taken while the ultrasonic inspection system is in contact with the surface of the workpiece. In some illustrative examples, taking the thermographic image of the first region of the surface of the workpiece using the thermographic inspection system comprises taking the thermographic image of the first region through a channel of a frame structure connected to the thermographic inspection system (operation 1208).

In some illustrative examples, taking the thermographic image of the first region is performed as one of a series of successive thermographic inspections of the surface of the workpiece, and wherein the ultrasonic inspection of the inconsistency is performed after all of the series of successive thermographic inspections (operation 1210). In some illustrative examples, taking the thermographic image of the first region is performed as one of a series of successive thermographic inspections of the surface of the workpiece, and wherein the ultrasonic inspection of the inconsistency is performed in response to locating the inconsistency and prior to performing any remaining inspections of the series of successive thermographic inspections (operation 1212).

In some illustrative examples, method 1200 moves the ultrasonic inspection system to a position over the inconsistency using a displacement system connected to the frame structure (operation 1214). In some illustrative examples, moving the ultrasonic inspection system to the position obstructs a portion of the channel with the ultrasonic inspection system and a y-axis displacement device of the displacement system (operation 1216).

In some illustrative examples, moving the ultrasonic inspection system to the position comprises at least one of moving the ultrasonic inspection system in a first direction using a y-axis displacement device of the displacement system or moving the y-axis displacement device in a second direction perpendicular to the first direction using an x-axis displacement device of the displacement system (operation 1218).

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

Figure 13B:
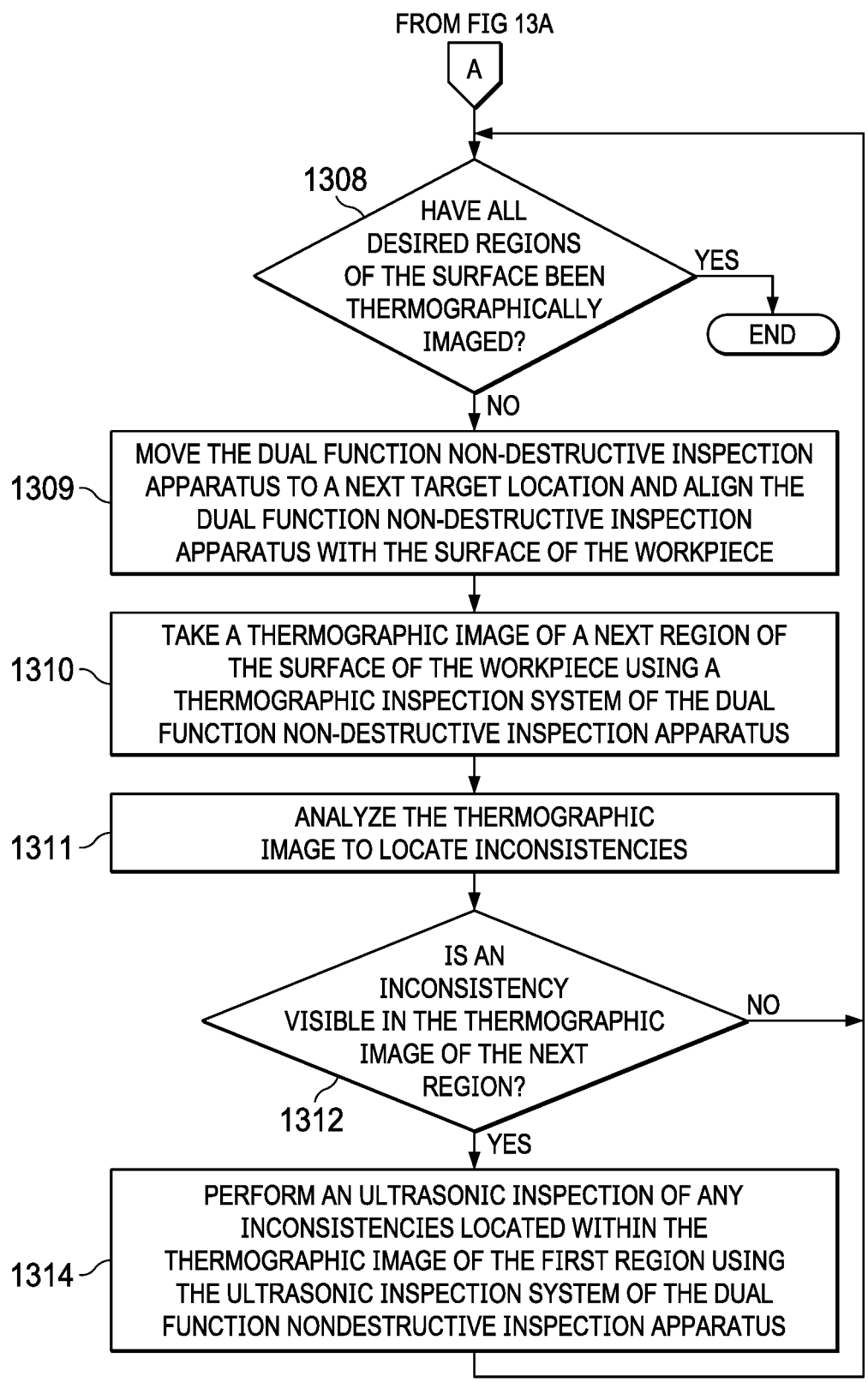

Turning now to FIGS. 13A and 13B, illustrations of a flowchart of a method for inspecting a workpiece are depicted in accordance with an illustrative example. Method 1300 may be implemented using dual function non-destructive inspection apparatus 102 of FIG. 1. Method 1300 may be used to inspect workpiece 103 of FIG. 1. Method 1300 may be implemented using dual function non-destructive inspection apparatus 200 of FIG. 2. Method 1300 may be used to inspect workpiece 208 of FIG. 2. Method 1300 may be implemented using dual function non-destructive inspection apparatus 300 of FIGS. 3-8 and 10-11. Method 1300 may be used to inspect workpiece 900 of FIG. 9.

Method 1300 moves a dual function non-destructive inspection apparatus to a target location and aligns the dual function non-destructive inspection apparatus with a surface of a workpiece (operation 1301). Method 1300 takes a thermographic image of a region of the surface of the workpiece using a thermographic inspection system of the dual function non-destructive inspection apparatus (operation 1302). Method 1300 analyzes the thermographic image to locate inconsistencies (operation 1303). Method 1300 determines if an inconsistency is visible in the thermographic image of the region (decision 1304). If an inconsistency is visible in the thermographic image, method 1300 performs an ultrasonic inspection of any inconsistencies location within the thermographic image of the region using an ultrasonic inspection system of a dual function non-destructive inspection apparatus (operation 1306).

Prior to performing an ultrasonic inspection in operation 1306, the ultrasonic inspection system may be moved relative to the workpiece to position the ultrasonic inspection system relative to the inconsistency. During operation 1306, the ultrasonic probe of ultrasonic inspection system rides on the surface of the workpiece. When the surface of the workpiece is curved, the ultrasonic probe of ultrasonic inspection system scanning over surface will follow a curved surface. The ultrasonic probe of ultrasonic inspection system will follow a curved surface because the ultrasonic probe is riding on the surface.

Method 1300 determines if all desired regions of the surface have been thermographically imaged (decision 1308). If all desired regions of the surface have been thermographically imaged, method 1300 terminates.

If all desired regions of the surface have not been thermographically imaged, method 1300 moves the dual function non-destructive inspection apparatus to a next target location and aligns the dual function non-destructive inspection apparatus with the surface of the workpiece (operation 1309). Method 1300 then takes a thermographic image of a next region of the surface of the workpiece using the thermographic inspection system of the dual function non-destructive inspection apparatus (operation 1310). After taking the thermographic image of the next region, method 1300 analyzes the thermographic image to locate inconsistencies (operation 1311). Method 1300 determines if an inconsistency is visible in the thermographic image of the next region (decision 1312). If no inconsistencies are visible in the thermographic image of the next region, decision 1308 is repeated.

Method 1300 performs an ultrasonic inspection of any inconsistencies located within the thermographic image of the first region using the ultrasonic inspection system of the dual function non-destructive inspection apparatus (operation 1314). After performing an ultrasonic inspection of any inconsistencies located in the thermographic image of the next region, decision 1308 is repeated.

Figure 14:
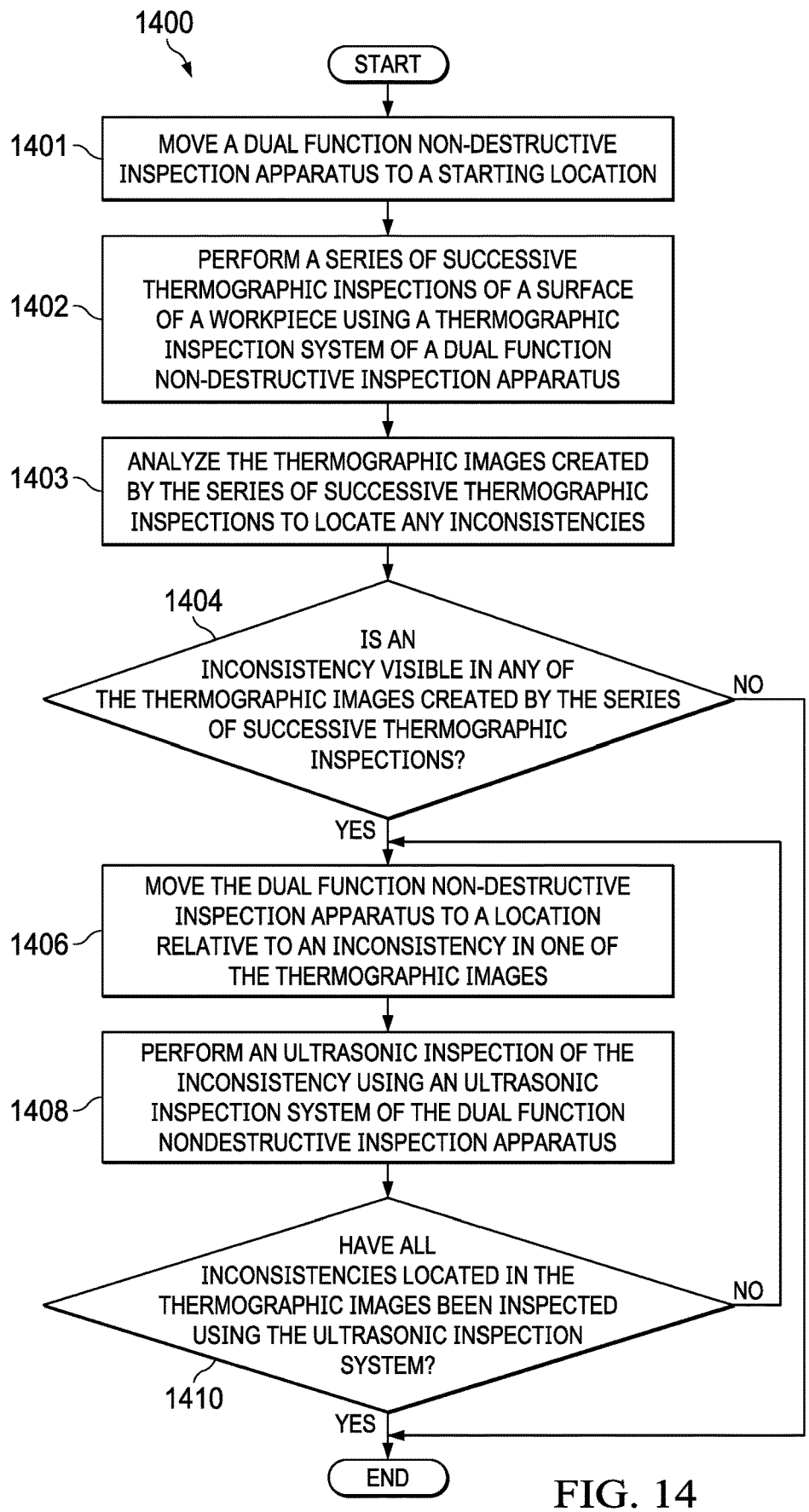
FIG. 14 is an illustration of a flowchart of a method of inspecting a workpiece in accordance with an illustrative example.

Turning now to FIG. 14, an illustration of a flowchart of a method for inspecting a workpiece is depicted in accordance with an illustrative example. Method 1400 may be implemented using dual function non-destructive inspection apparatus 102 of FIG. 1. Method 1400 may be used to inspect workpiece 103 of FIG. 1. Method 1400 may be implemented using dual function non-destructive inspection apparatus 200 of FIG. 2. Method 1400 may be used to inspect workpiece 208 of FIG. 2. Method 1400 may be implemented using dual function non-destructive inspection apparatus 300 of FIGS. 3-8 and 10-11. Method 1400 may be used to inspect workpiece 900 of FIG. 9.

Method 1400 moves a dual function non-destructive inspection apparatus to a starting location (operation 1401). Method 1400 performs a series of successive thermographic inspections of a surface of a workpiece using a thermographic inspection system of a dual function non-destructive inspection apparatus (operation 1402). Method 1400 analyzes the thermographic images created by the series of successive thermographic inspections to locate any inconsistencies (operation 1403). Method 1400 determines if an inconsistency is visible in any of the thermographic images created by the series of successive thermographic inspections (decision 1404). If an inconsistency is located in at least one of the thermographic images, the inconsistency may receive additional inspection to characterize the inconsistency.

As depicted, method 1400 moves the dual function non-destructive inspection apparatus to a location relative to an inconsistency in one of the thermographic images (operation 1406). The dual function non-destructive inspection apparatus is moved using a movement system such as a gantry, a robotic arm, or a holonomic motion base.

Method 1400 performs an ultrasonic inspection of the inconsistency using an ultrasonic inspection system of the dual function non-destructive inspection apparatus (operation 1408). Prior to performing an ultrasonic inspection, the ultrasonic inspection system is positioned relative to the surface of the workpiece.

After performing the ultrasonic inspection, method 1400 determines if all inconsistencies located in the thermographic images have been inspected using the ultrasonic inspection system (decision 1410). If all inconsistencies located in the thermographic images have been inspected, method 1400 terminates. If all inconsistencies located in the thermographic images have not been inspected, operations 1406 and 1408 are repeated.

The flowcharts and block diagrams in the different depicted examples illustrate the architecture, functionality, and operation of some possible implementations of apparatus and methods in an illustrative example. In this regard, each block in the flowcharts or block diagrams may represent a module, a segment, a function, and/or a portion of an operation or step.

In some alternative implementations of an illustrative example, the function or functions noted in the blocks may occur out of the order noted in the Figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, not all blocks of method 1200 are performed. For example, operations 1208 through 1218 of FIG. 12 are optional.

Figure 15:
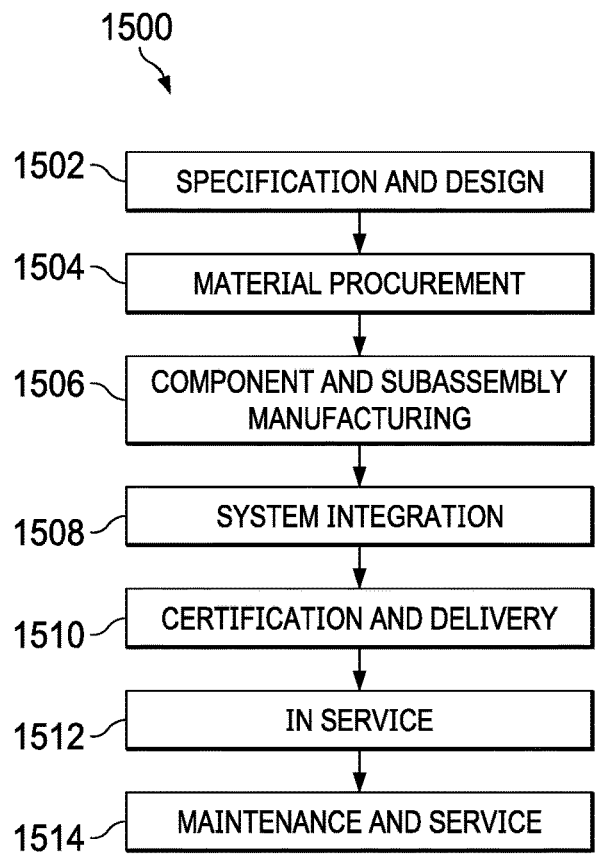
FIG. 15 is an illustration of an aircraft manufacturing and service method in the form of a block diagram in accordance with an illustrative example.
Figure 16:
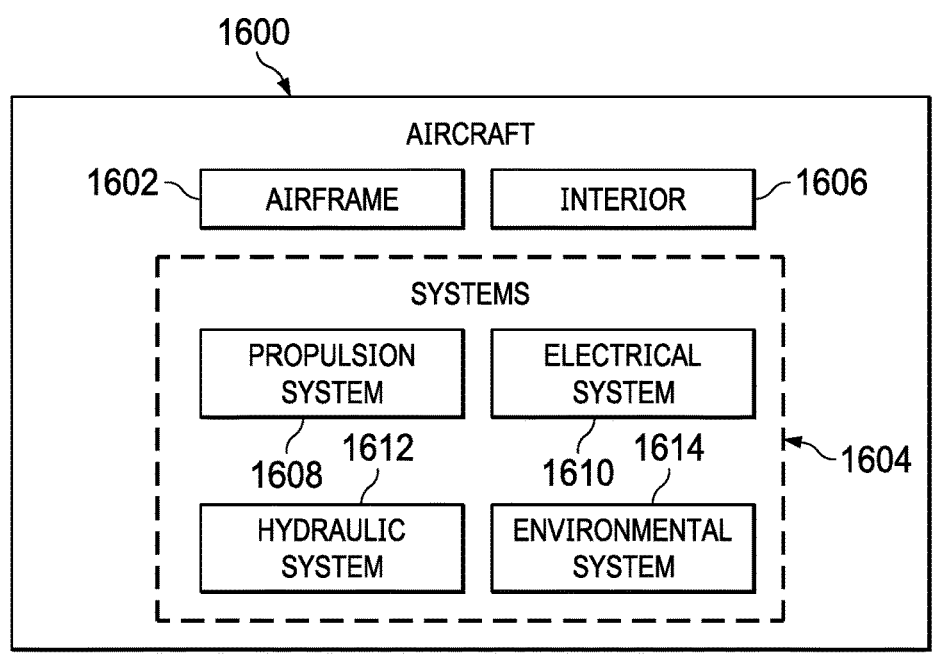
FIG. 16 is an illustration of an aircraft in the form of a block diagram in which an illustrative example may be implemented.

The illustrative examples of the present disclosure may be described in the context of aircraft manufacturing and service method 1500 as shown in FIG. 15 and aircraft 1600 as shown in FIG. 16. Turning first to FIG. 15, an illustration of an aircraft manufacturing and service method is depicted in accordance with an illustrative example. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 takes place. Thereafter, aircraft 1600 may go through certification and delivery 1510 in order to be placed in service 1512. While in service 1512 by a customer, aircraft 1600 is scheduled for maintenance and service 1514, which may include modification, reconfiguration, refurbishment, and other maintenance or service.

Each of the processes of aircraft manufacturing and service method 1500 may be performed or carried out by a system integrator, a third party, and/or an operator. In these examples, the operator may be a customer. For the purposes of this description, a system integrator may include, without limitation, any number of aircraft manufacturers or major-system subcontractors; a third party may include, without limitation, any number of vendors, subcontractors, or suppliers; and an operator may be an airline, a leasing company, a military entity, a service organization, and so on.

With reference now to FIG. 16, an illustration of an aircraft is depicted in which an illustrative example may be implemented. In this example, aircraft 1600 is produced by aircraft manufacturing and service method 1500 in FIG. 15 and may include airframe 1602 with a plurality of systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative examples may be applied to other industries, such as the automotive industry.

Apparatuses and methods embodied herein may be employed during at least one of the stages of aircraft manufacturing and service method 1500. One or more illustrative examples may be used during component and subassembly manufacturing 1506, system integration 1508, or maintenance and service 1514 of FIG. 15. For example, workpiece 103 of FIG. 1 may be a component of aircraft 1600, during component and subassembly manufacturing 1506. As another example, workpiece 103 may be a component of aircraft 1600 inspected by dual function non-destructive inspection apparatus 102 during maintenance and service 1514 of FIG. 15.

Apparatuses and methods embodied herein may be employed in manufacturing at least one component of aircraft 1600. For example, workpiece 103 may be a component of one of airframe 1602 or interior 1606.

The illustrative examples provide a system with infrared inspection (IRT) and ultrasound inspection (UT) on the same automated/robotic end effector without having to change equipment. This system enables high-speed discovery over large areas of inconsistencies using IRT, and then more detailed high-resolution characterization using UT of the specific inconsistencies found by the wide-area IRT scan. The system is mounted on any desirable movement system, such as a holonomic motion base, a robotic arm, or a gantry and can be used as part of an automated dual-mode NDI system.

The system comprises a thermographic imager on which is mounted a structure having an opening to allow the thermographic imager to perform thermal imaging therethrough, and a displacement device on the structure for positioning an ultrasonic imager relative to an inconsistency location identified via thermal imaging, for performing subsequent ultrasonic imaging of the inconsistency. The illustrative examples provide at least one of significant cost reduction and flow time reduction for inspection of one-off and low rate structures. The illustrative examples provide for inspection of in-service structures being assessed for damage or repair validation.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A dual function non-destructive inspection apparatus comprising:
   a frame structure having a channel, a first end, and a second end, wherein the channel extends through the frame structure from the first end to the second end;
   a thermographic inspection system associated with the first end of the frame structure;
   a displacement system connected to the second end of the frame structure; and
   an ultrasonic inspection system connected to the displacement system such that the displacement system moves the ultrasonic inspection system relative to the channel of the frame structure.

2. The dual function non-destructive inspection apparatus of claim 1, wherein the displacement system comprises an x-axis displacement device and a y-axis displacement device coupled to the x-axis displacement device such that the y-axis displacement device is configured for y-axis movement in a first direction and the x-axis displacement device is configured for movement of the y-axis displacement device in a second direction perpendicular to the first direction.

3. The dual function non-destructive inspection apparatus of claim 2, wherein the displacement system is mounted such that the x-axis displacement device does not obstruct the channel of the frame structure, and wherein y-axis displacement device is moveable such that the y-axis displacement device does not obstruct the channel of the frame structure during operation of the thermographic inspection system.

4. The dual function non-destructive inspection apparatus of claim 1, wherein a line-of-sight of an infrared camera of the thermographic inspection system is directed towards the second end and extends through the channel of the frame structure.

5. The dual function non-destructive inspection apparatus of claim 1, wherein an ultrasonic transducer of the ultrasonic inspection system is directed away from the frame structure.

6. The dual function non-destructive inspection apparatus of claim 1 further comprising:
   an interface configured to connect the dual function non-destructive inspection apparatus to a movement system for movement within an inspection environment.

7. A method of inspecting a workpiece, the method comprising:
   taking a thermographic image of a first region of a surface of a workpiece using a thermographic inspection system of a dual function non-destructive inspection apparatus;
   locating an inconsistency in the first region using the thermographic image; and
   performing an ultrasonic inspection of the inconsistency using an ultrasonic inspection system of the dual function non-destructive inspection apparatus after locating the inconsistency.

8. The method of claim 7, wherein the thermographic image is taken while the ultrasonic inspection system is in contact with the surface of the workpiece.

9. The method of claim 7, wherein taking the thermographic image of the first region is performed as one of a series of successive thermographic inspections of the surface of the workpiece, and wherein the ultrasonic inspection of the inconsistency is performed after all of the series of successive thermographic inspections.

10. The method of claim 7, wherein a controller of the dual function non-destructive inspection apparatus controls the ultrasonic inspection of the inconsistency based on location data determined from the thermographic image.

11. The method of claim 7, wherein taking the thermographic image of the first region is performed as one of a series of successive thermographic inspections of the surface of the workpiece, and wherein the ultrasonic inspection of the inconsistency is performed in response to locating the inconsistency and prior to performing any remaining inspections of the series of successive thermographic inspections.

12. The method of claim 7, wherein taking the thermographic image of the first region of the surface of the workpiece using the thermographic inspection system comprises taking the thermographic image of the first region through a channel of a frame structure connected to the thermographic inspection system.

13. The method of claim 12 further comprising:
   moving the ultrasonic inspection system to a position over the inconsistency using a displacement system connected to the frame structure.

14. The method of claim 13, wherein moving the ultrasonic inspection system to the position obstructs a portion of the channel with the ultrasonic inspection system and a y-axis displacement device of the displacement system.

15. The method of claim 13, wherein moving the ultrasonic inspection system to the position comprises at least one of moving the ultrasonic inspection system in a first direction using a y-axis displacement device of the displacement system or moving the y-axis displacement device in a second direction perpendicular to the first direction using an x-axis displacement device of the displacement system.

16. An end effector configured to perform thermographic inspection and ultrasonic inspection, the end effector comprising:
   a thermographic inspection system separated from an ultrasonic inspection system by a frame structure of the end effector, wherein the thermographic inspection system and the ultrasonic inspection system are both positioned on the end effector; and
   the ultrasonic inspection system movable relative to a line-of-sight of an infrared camera of the thermographic inspection system,
   wherein the end effector is configured to be removably attached to a movement system to position the thermographic inspection system and the ultrasonic inspection system of the end effector.

17. The end effector of claim 16 further comprising:
   a displacement system between the thermographic inspection system and the ultrasonic inspection system, wherein the ultrasonic inspection system is mounted to the displacement system.

18. The end effector of claim 17, wherein the displacement system comprises a y-axis displacement device and an x-axis displacement device.

19. The end effector of claim 17 further comprising:
   a controller configured to control at least one of the thermographic inspection system, the ultrasonic inspection system, the displacement system, or a movement system, wherein the movement system is configured to move the end effector within an inspection environment.

20. The end effector of claim 16, wherein the line-of-sight of the infrared camera of the thermographic inspection system extends through a channel of the frame structure.

* * * * *